United States Patent
Khan

(10) Patent No.: US 8,520,701 B2
(45) Date of Patent: *Aug. 27, 2013

(54) SYSTEMS AND METHODS FOR INTERWORKING QSIG AND H.323 SIGNALING IN A SIP-BASED NETWORK

(75) Inventor: Naseem A. Khan, Oak Hill, VA (US)

(73) Assignee: Verizon Services Corp., Ashburn, VA (US)

(*) Notice: Subject to any disclaimer, the term of this patent is extended or adjusted under 35 U.S.C. 154(b) by 267 days.

This patent is subject to a terminal disclaimer.

(21) Appl. No.: 12/611,696

(22) Filed: Nov. 3, 2009

(65) Prior Publication Data

US 2010/0054259 A1    Mar. 4, 2010

Related U.S. Application Data

(63) Continuation of application No. 11/224,752, filed on Sep. 12, 2005, now Pat. No. 7,817,665.

(60) Provisional application No. 60/667,600, filed on Apr. 1, 2005.

(51) Int. Cl.
*H04J 3/16* (2006.01)

(52) U.S. Cl.
USPC .......................... 370/467; 370/352; 370/401

(58) Field of Classification Search
None
See application file for complete search history.

(56) References Cited

U.S. PATENT DOCUMENTS

| | | | |
|---|---|---|---|
| 6,795,430 B1 * | 9/2004 | Ong et al. | 370/352 |
| 7,136,372 B1 * | 11/2006 | Nilsen | 370/352 |
| 7,366,780 B2 * | 4/2008 | Keller et al. | 709/227 |
| 7,372,876 B2 * | 5/2008 | Abel et al. | 370/524 |
| 7,437,465 B2 * | 10/2008 | Rousseau | 709/227 |
| 2002/0085517 A1 | 7/2002 | Lee et al. | |
| 2003/0224781 A1 * | 12/2003 | Milford et al. | 455/426.1 |
| 2004/0081160 A1 | 4/2004 | Rousseau | |
| 2004/0174864 A1 | 9/2004 | Klaghofer | |
| 2005/0018652 A1 | 1/2005 | Crouch et al. | |

OTHER PUBLICATIONS

H.323 Forum, H.323 Standards, Retrieved from Internet Site: http://www.h373.forum.org/standards, pp. 1-4 (no admission that this constitutes prior art) Retrieved Mar. 2, 2005.

ECMA International, Standard ECMA-332—Corporate Telecommunication Networks-Signalling Interworking Between QSIG andH.323—Basic Services, Retrieved Mar. 2, 2005 from Internet Site http://www.ecma-international.org/publications/standards/Ecma-332.htm, pp. 1-2 (no admission that this constitutes prior art). Retrieved Mar. 2, 2005.

(Continued)

*Primary Examiner* — Michael J Moore, Jr.

(57) ABSTRACT

A SIP-based network architecture is defined allowing a variety of access methods for interfacing QSIG-based signaling devices. The QSIG-based signaling devices are typically enterprise-based PBXs that either interface directly via QSIG, or adapt QSIG signaling to related signaling protocols via gateways, which can be customer premise or network based. The gateways can either interwork QSIG signaling or tunnel QSIG signaling over H.323, SIP, or other protocols. Upon reaching the SIP-based network, Session Border Controllers process the signaling. The Session Border Controllers terminate the tunnel (if used) and extracts the QSIG signaling for interworking to SIP, thereby facilitating a homogeneous SIP-based core network. In addition to interworking QSIG signaling, the Session Border Controllers perform other signaling related functions for the SIP-based network that are performed at a point as near as possible to the network's edge.

24 Claims, 18 Drawing Sheets

(56) References Cited

OTHER PUBLICATIONS

H.323 Protocols Suite, Retrieved Feb. 15, 2005 from Internet Site http://www.protocols.com/pbook/h323.htm, pp. 1-26 (no admission that this constitutes prior art).
Internet Telephony, Session Border Control Solutions, Retrieved Mar. 9, 2005 from Internet Site http://www.tmcneet.com/it/0304/SpecialFocus.htm, pp. 1-9 (no admission that this constitutes prior art).
PQM Consultants, About QSIG—Frequently Asked Questions (FAQ), Retrieved Feb. 15, 2005 from Internet Site http://www.pqmconsultants.com/qsigfaq.htm, pp. 1-5 (no admission that this constitutes prior art).
Radvision, H.323 Toolkit, For Developing All Types of H.323 Entities, Retrieved Feb. 25, 2005 from Internet Site http://www.radvision.com/DeveloperSolutions/ProtocolToolkitsAndPlatforms/H323/H323Toolkit/, p. 1-3 (no admission that this constitutes prior art).
ECMA International, Standard ECMA-307 Corporate Telecommunication Networks—Signaling Interworking Between QSIG and H.323—Generic Functional Protocol for the Support of Supplementary Services, Retrieved Mar. 2, 2005 from Internet Site http://www.ecma-international.org/publications/standards/Ecma-307.htm, pp. 1-2 (no admission that this constitutes prior art).
Networkworldfusion, SIP (Session Initiation Protocol), Retrieved Feb. 15, 2005 from Internet Site http://www.nwfusion.com/details/500.html, pp. 1-4 (no admission that this constitutes prior art).
PQM Consultants, Private Integrated Services Network Signaling (QSIG/PSS1), Retrieved Mar. 2, 2005 from Internet Site http://www.pqmconsultants.com/qsig.htm, p. 1 of 1 (no admission that this constitutes prior art).
Supinfo Projects, Voice Over IP—Evolutionary Technology and Future of the International Telecommunication, Retrieved Feb. 25, 2005 from Internet Site http://www.supinfo-projects/en/2005/voip_brookes/3/, pp. 1-16 (no admission that this constitutes prior art).
Multi-Service Forum, Technical Information: IPR Policy, Retrieved Mar. 14, 2005 from Internet Site http://www.msforum.org/member/policies/iprpolicy.shtml, pp. 1-3 (no admission that this constitutes prior art).
Telecommunications Online, Smart, Sexy Edges, Retrieved Mar. 9, 2005 from Internet Site http://www.telecommagazine.com/default.asp?journalid=3&func=articles&page=0210t11&year=2002&m..., pp. 1-4 (no admission that this constitutes prior art).
Acmepacket, About Session Border Controllers, Retrieved Mar. 3, 2005 from Internet Site http://www.acmepacket.com/html/page.asp?PageID={3C514BC3-2213-470A-A462-60BA64D56011}, pp. 1-2 (no admission that this constitutes prior art).
Acmepacket, Fact Sheet, Retrieved Mar. 3, 2005 from Internet Site http://www.acmepacket.com/html/page.asp?PageID={E1830F41-14E0-4A5B-9155-CAE5B92BE841}, pp. 1-5 (no admission that this constitutes prior art).
ECMA International, Standard ECMA-333 Private Integrated Services Network (PISN)—Mapping Functions for the Tunnelling of QSIG through H.323 Networks, Retrieved Mar. 2, 2005 from Internet Site http://www.ecma-international.org/publications/standards/Ecma-333.htm, pp. 1-2 (no admission that this constitutes prior art).
Handley et al., SIP: Session Initiation Protocol, Article, Mar. 1999, pp. 1-153, Network Working Group.
ECMA International, Standard ECMA-355 Corporate Telecommunication Networks—Tunnelling of QSIG Over SIP, Jun. 2004, 1st Edition, pp. 1-16.
QSIG, The Handbook for Communications Managers, Booklet, Aug. 1995, pp. 1-51, InterConnect Communications Ltd, Gwent, United Kingdom.
Radvision Ltd., An Overview of H.323—SIP Interworking, Aug. 2001, pp. 1-15, Radvision Ltd.
ECMA International, Standard ECMA—333 Private Integrated Services Network (PISN)—Mapping Functions for the Tunnelling of QSIG Through H.323 Networks, Dec. 2003, 2nd Edition, pp. 1-31.

Vinod K. Bhat, Voice Over IP—The SIP Way, Apr. 2001, pp. 1-16, Tata Consultancy Services.
ECMA, Standard ECMA—339 Corporate Telecommunication Networks—Signalling Interworking Between QSIG and SIP—Basic Services, Dec. 2002, pp. 1-56.
ECMA, Standard ECMA-307 Corporate Telecommunication Networks—Signalling Interworking Between QSIG and H.323—Generic Functional Protocol for the Support of Supplementary Services, Jun. 2000, pp. 1-34.
International Telecommunication Union, ITU-T, H.323 Annex M.1, Series H: Audiovisual and Multimedia Systems, Nov. 2000, pp. 1-8.
Alcatel, QSIG (Q Signaling), Jan. 2002, pp. 1-7.
ECMA, Standard ECMA—332, Corporate Telecommunication Networks—Signalling Interworking Between QSIG and H.323—Basic Services, Dec. 2001, pp. 1-54.
Network World Fusion, H.323 vs. SIP, Retrieved Feb. 15, 2005 from Internet Site http://www.worldfusion.com/newsletters/converg/2002/01416213.html, pp. 1-4 (no admission that this constitutes prior art).
Von Magazine, The Secret World of Interworking, Retrieved Feb. 15, 2005 from Internet Site http://www.vonmag.com/issue/2003/novdec/features/interworking.htm, pp. 1-4 (no admission that this constitutes prior art).
Telecom Magazine, Session Border Control—Making Dreams Reality, Magazine, 2003, pp. 1-10.
Glasmann et al., Service Architectures in H.323 and SIP: A Comparison, Journal, Fourth Quarter 2003, vol. 5, No. 2, IEEE Communications Surveys & Tutorials, pp. 32-47.
Acmepacket, Session Border Controllers: Delivering Interactive Communications Across IP Network Borders, White Paper, Feb. 19, 2003, pp. 1-12.
Internet Engineering Task Force, Tunnelling of QSIG Over SIP, Memorandum, Jan. 2005, pp. 1-15.
PQM Consultants, QSIG Services in Packet-Based Multi-Media Communication Systems, Retrieved Feb. 15, 2005 from Internet Site http://www.pqmconsultants.com/qsigH450.htm, pp. 1-2 (no admission that this constitutes prior art).
Naseem Khan, Session Border Gateway—Q.SIG Tunneling & H.323—SIP Interworking Function, Apr. 4, 2005, pp. 1-17, Verizon.
Liu et al., "Voice Over IP Signaling: H.323 and Beyond", IEEE, Oct. 2000.
Cisco SIP Proxy Server Administrator Guide, Version 2.0, Chapter 1: Product Overview, Copyright 2002, pp. 1-10.
Delivering Peak Performance for Premium, Interactive Communications Voice, Video and Multimedia Sessions—Across IP Network Borders, Acme Packet Inc, Copyright 2003, 2 pages.
The H.323 Revolution, Radvision, www.radvision.com, Copyright 2002, pp. 1-13.
Voizbridge, A Carrier-Class Session Controller Solution, that is Unmatched in Value, Versatility and Performance, Mediaring Inc., 2001, 3 pages.
Donaldson, et al, Hybrid Networking for Business Applications, Bell-Northern Research, UK., IEE Conference on Telecommunications, Jan. 1, 1991, pp. 112-117.
Ho, et al, A Conference Gateway Supporting Interoperability Between SIP and H.323, Copyright 2001, 10 pages.
Krishnamurthy, MSF Session Border Gateway Requirements, Multiservice Switching Forum Contribution, Contribution No. msf2005.xxx.00, Working Group: Architecture, Copyright 2005, 20 pages.
Kumar, et al, IP Telephony with H.323: Architectures for Unified Networks and Integrated Services, Chapter 12, Principles of Interworking, ISBN: 0471393436, John Wiley & Sons, Mar. 30, 2001, pp. 387-391.
Moos, Voice over IP standards und technic, Jul. 2001, pp. 1-11.
Voznak, Comparison of H.323 and SIP Protocol Specification, Department of Electronics and Telecommunications Technology, Faculty Of Electrical Engineering and Computer Science, Technical University of Ostrava, ISBN 80-227-1934-X, Sep. 2003, pp. 45-47.

\* cited by examiner

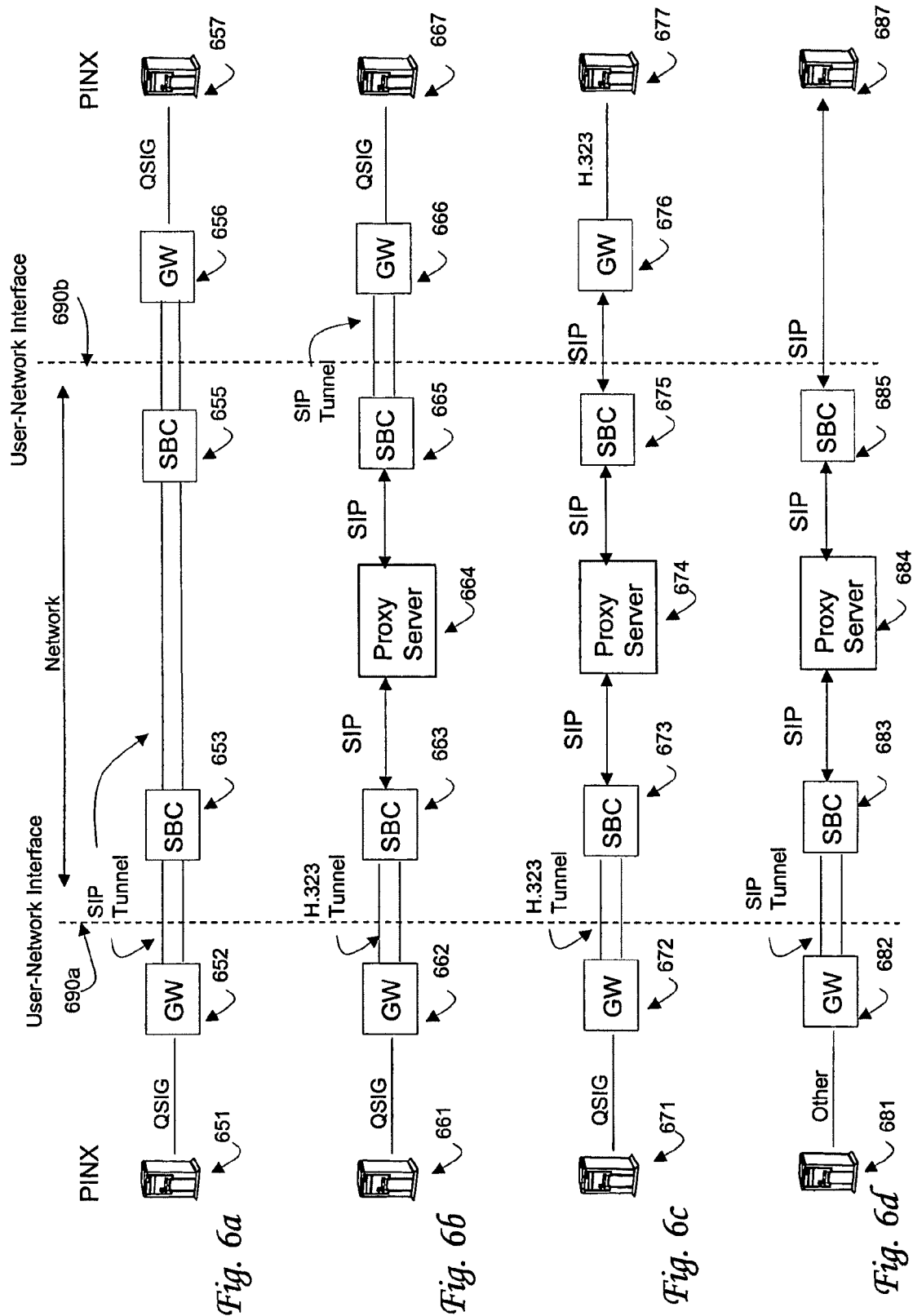

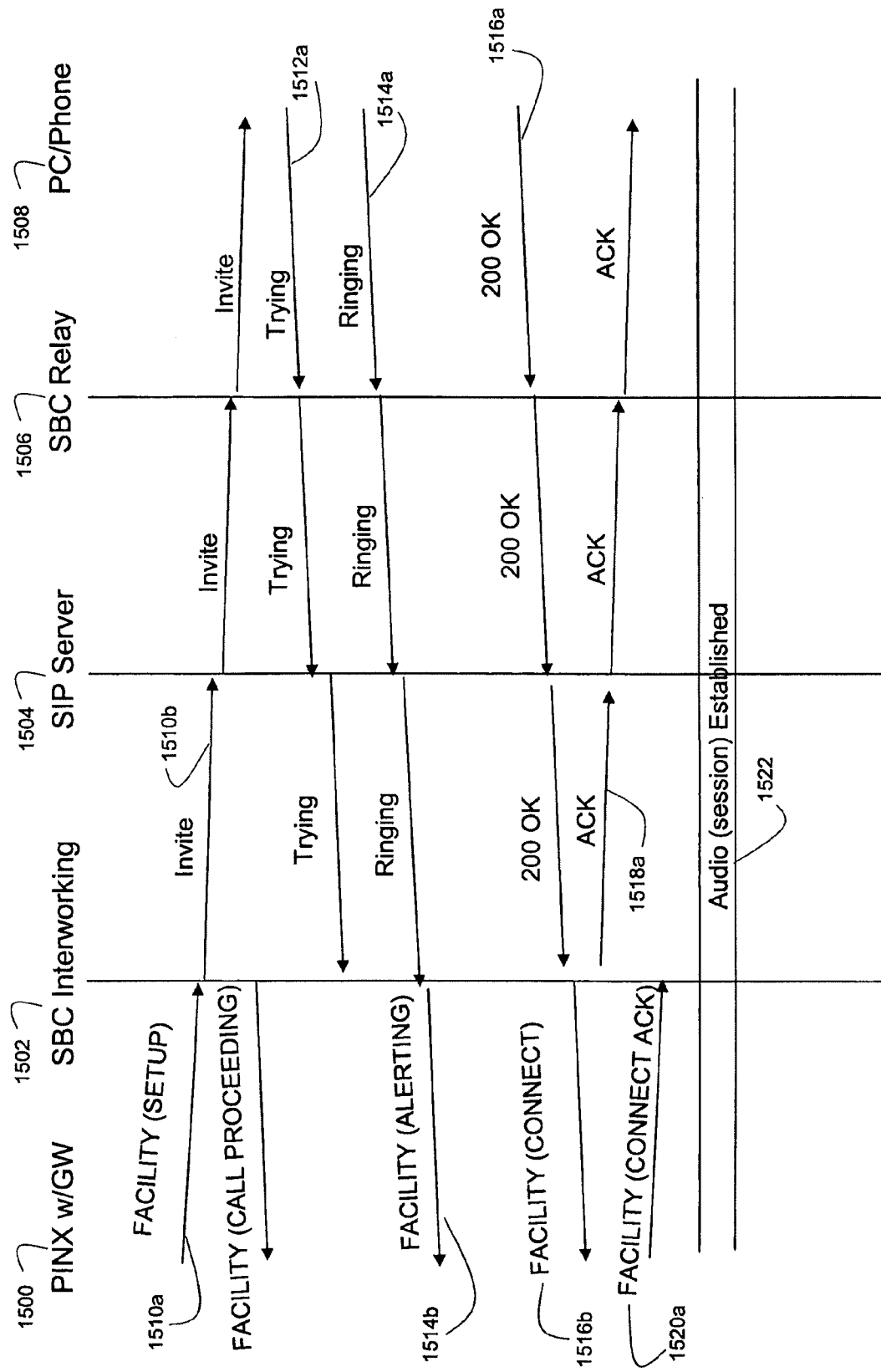

US 8,520,701 B2

SYSTEMS AND METHODS FOR INTERWORKING QSIG AND H.323 SIGNALING IN A SIP-BASED NETWORK

CROSS REFERENCE TO RELATED APPLICATIONS

This application is a continuation of U.S. patent application Ser. No. 11/224,752, filed on Sep. 12, 2005, which claims priority to U.S. Provisional Patent Application Ser. No. 60/667,600, filed Apr. 1, 2005, the contents of which are hereby incorporated by reference in their entirety.

BACKGROUND INFORMATION

The public switched telephone network's (PSTN) primary service has been to provide Plain Old Telephone Service (POTS), which has been accomplished using circuit switching technology and techniques. Traditionally, calls were established using circuits having defined bandwidth and characteristics suitable for voice transfer. In contrast, the Internet is a packet switched network designed for data transfer in which bandwidth can be allocated as needed. The PSTN and the Internet are evolving, to an extent, so as to adopt certain aspects and Capabilities of the other.

One service that is involved in the evolution of both networks is voice traffic. At a high level, the traditional circuit switch telephone network is migrating towards transporting voice using packet switching technology. This offers the prospect of increased efficiencies and utilization of common equipment for voice, data, and video traffic. Similarly, the Internet that was initially developed to handle data transfer between computers has been adapted to carry voice calls. Various approaches have been created to convey voice over the Internet ("VoIP"), and many of the capabilities present in the PSTN are being adapted to VoIP environments While the public networks and the Internet are evolving, so are private networks. Private networks are typically based on customer premises equipment (CPE) owned and operated by businesses. Private networks allow deployment of features that are not readily available from the public network providers often at a lower cost. The switching equipment is typically in the form of a private branch exchange (PBX) switch. Larger businesses (e.g., an "enterprise") may deploy multiple PBXs at different locations and interconnect them using tie-lines or tie-trunks. This allows calls to be routed within the private network to remote locations. The PBXs typically have interfaces to the public switched telephone network (PSTN) for handling calls to users "off" the private network.

Enterprises deploying PBXs have also discovered the benefits of integrating voice on IP based networks. However, doing so can complicate the interworking between the PSTN, IP networks, and other PBXs on the private networks. Typically, PBXs simply maintain their existing arrangement of interfaces and add a new interface for voice over IP networks. While this can offer the potential of saving money on certain types of calls, the overall complexity increases. Therefore, it is desired that a common architecture and network service be defined to accommodate the migration of PBXs to an IP network for various services.

BRIEF DESCRIPTION OF THE SEVERAL VIEWS OF THE DRAWING(S)

Reference will be made to the accompanying drawings, which are not necessarily drawn to scale, and wherein:

FIGS. 6a-6d illustrate various end-to-end interworking scenarios according to the principles of the present invention;

FIG. 15 illustrates one embodiment of the messages used for establishing a call between the two points according to the principles of the present invention.

DETAILED DESCRIPTION OF THE PREFERRED EMBODIMENT

The preferred embodiments according to the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
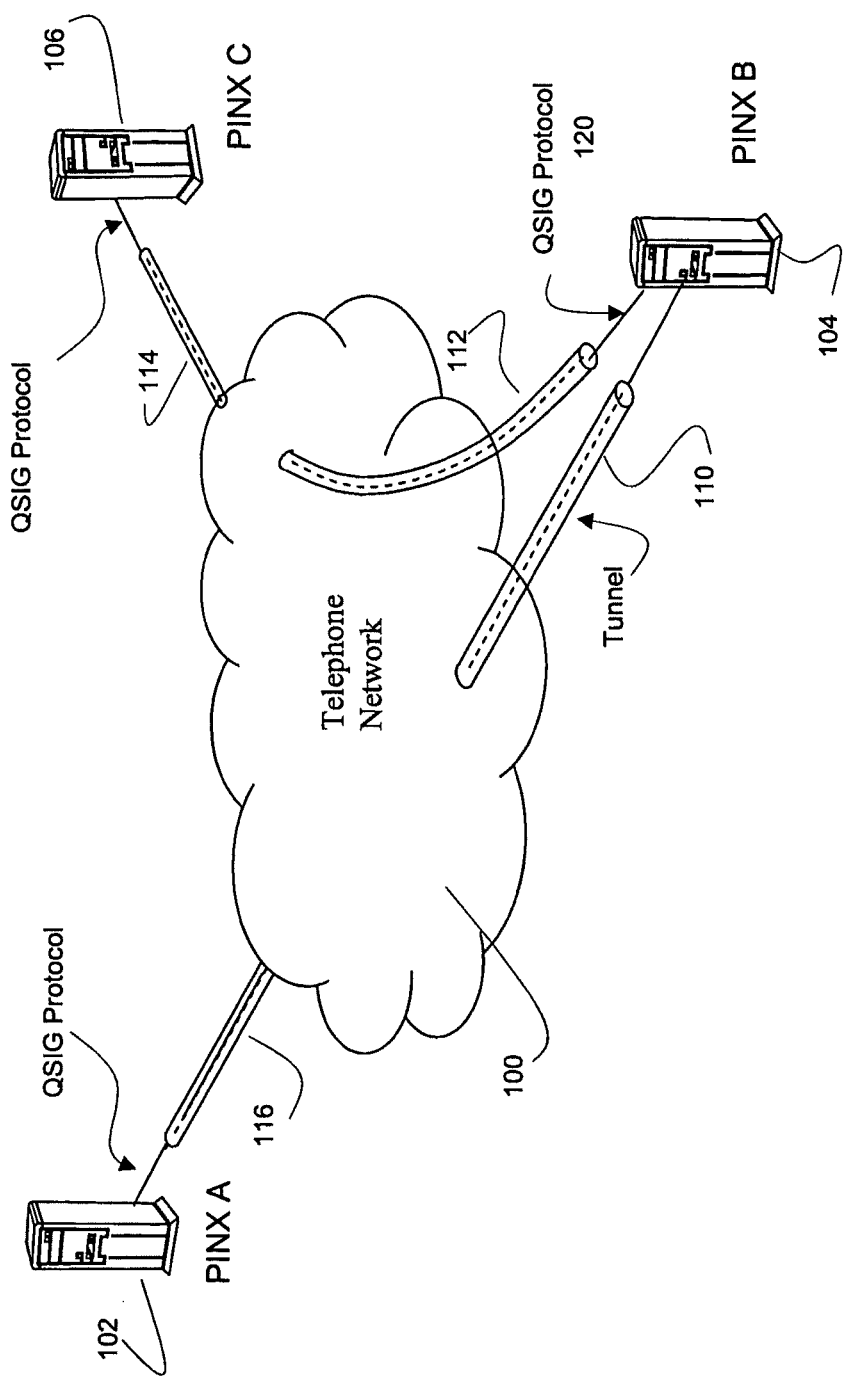
FIG. 1 depicts the prior art of interconnecting Private Integrated Service Exchanges.

FIG. 1 illustrates the prior art of a private network comprising a telephone network 100 and a plurality of Private Integrated Services Exchanges ("PINXs"). In the illustration, PINX A 102 has a connection to PINX B 104. This connection has a portion 116 that terminates on PINX A and another portion 110 that terminates on PINX B. This connection allows signaling messages to be conveyed in the order the messages are submitted and the messages are transmitted serially between PINX A and PINX B. This connection can be called a "tunnel", although the more common usage of the term implies a certain embodiment for carrying the signaling messages, as will be seen. Similarly, PINX B 104 has a tunnel 112, 114 established with PINX C 106.

The signaling between the PINXs is of a form known as "QSIG" (a contraction of "Q-SIGnaling"). QSIG signaling is based on ISDN signaling, and ISDN is defined by a series of International Telecommunication Union (ITU) standards known as Q.93X (where different values of X represent certain types of procedures). Whereas the Q.93X series is based on a public telephone interface, QSIG is slightly different from Q.93X standards in that QSIG adapts Q.93X procedures for PBXs. QSIG also allows PBX manufactures to provide additional services that may not be standardized. QSIG itself is standardized and is also referred to as Private Signaling System No. 1 (PSS1).

QSIG is used to control the communication between the PINX and the other PINXs, including establishing and terminating calls. This aspect is known as basic call control. However, PINXs provide numerous additional services, such as conference calling, call forwarding, call completion to busy subscriber, etc. Typically, a PINX may provide for dozens of such additional "supplementary services" (called so since they supplement basic call control operation). The signaling used for supplementary service control is defined for each service. In some cases, a single supplementary service may have multiple signaling approaches defined for allowing a user to interact with the service.

In FIG. 1, the tunnels are typically provided using dedicated circuits, called "tie-lines" or "tie-trunks" (because the circuit 'ties' together the two PBXs together). Essentially, the tunnel provides a connection-oriented data transfer service between the two PINXs. The same service could be provided via an IP network by using a connectionless data transfer capability (e.g., a form of packet switching) to provide the tunneling capability. At a high level, the tunnel could be provided by any protocol providing a reliable, connection-oriented service, such as TCP/IP.

Finally, in FIG. 1 the telephone network 100 is illustrated as a cloud, since the elements within the network are not shown at this point. Because of the nature of the tunneling service provided to the PINXs, the PINXs are largely not impacted about the details of the network architecture in order to transfer signaling from PINX to PINX.

The signaling is used to establish communication between the users (not shown). The communication could be a call involving voice grade communication, real-time video transfer, non-real time data transfer, or other types of data transfer. These instances of communication, which could be broadly called a "call", or a "session," are not shown in FIG. 1. Generally, the discussion herein focuses on signaling (called the 'control plane') and not the information transfer (called the 'user plane'). Further, although not shown, the PINX may also have separate interfaces to the telephone network in order to complete calls to destinations served by the PSTN.

IP networks are evolving independently from the PSTN, although greater convergence is occurring in order to facilitate interworking. For example, IP networks now carry voice calls in limited amounts, and interworking between IP networks and the PSTN is now required. To date, interworking has been accomplished by connecting IP networks with the PSTN using interworking devices (such as Media Gateway Controllers, Signaling Gateways, and Media Gateways).

Figure 2:
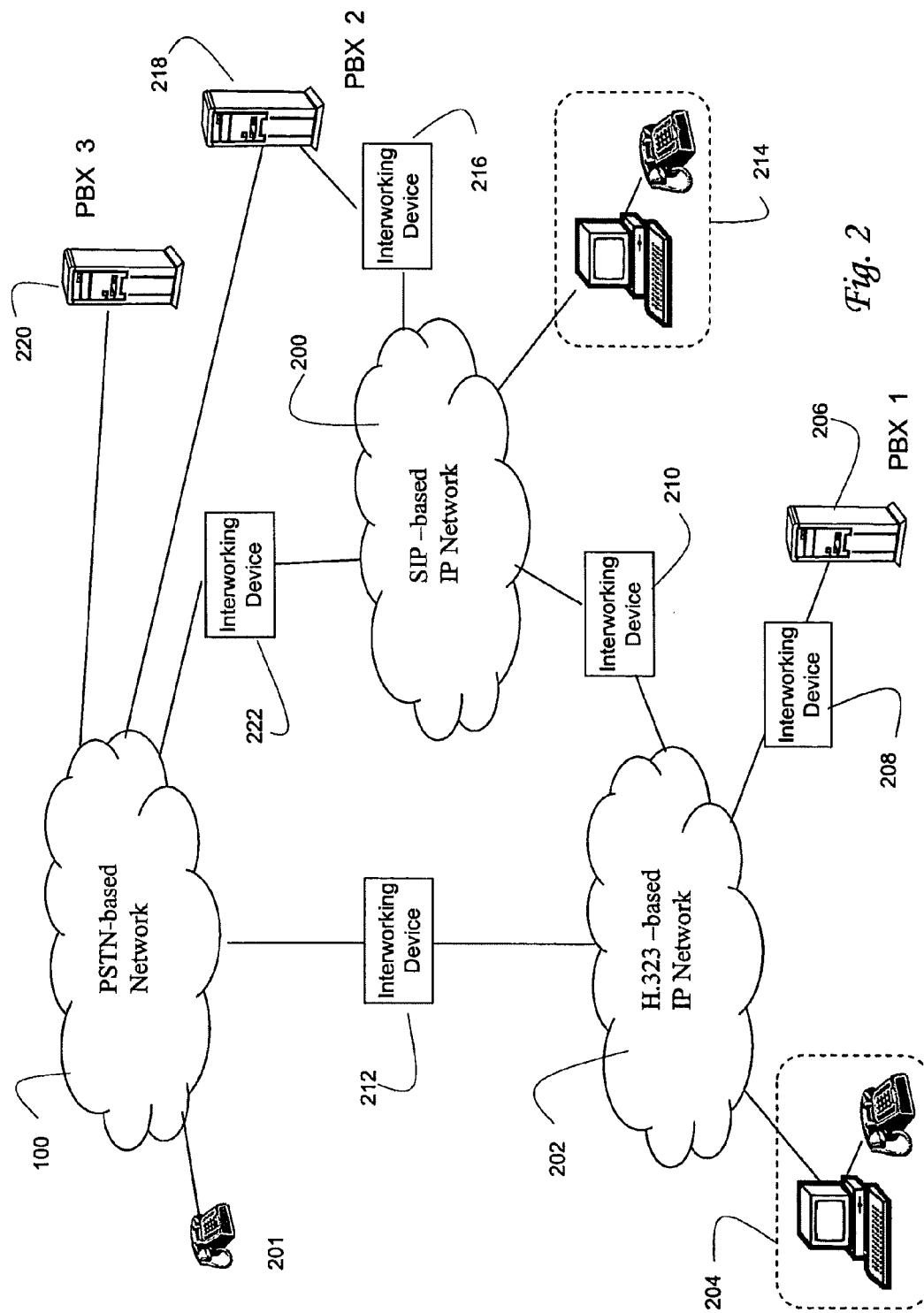
FIG. 2 depicts one embodiment of interconnecting various types of networks for signaling.

FIG. 2 shows the PSTN network separate from IP-based network. Specifically, in FIG. 2, the PSTN network 100 is shown interfacing with end users such as traditional telephones 201 and PBXs 220. A SIP-based IP network 200 and a H.323-based IP network 202 are shown as well. Both the SIP-based network 200 and the H.323 network 202 are IP-based networks, and represent two disjoint approaches for conveying voice over the Internet. Thus, although both the H.323-based and SIP-based networks are shown as separate logical networks, they may share common lower layers of the IP network infrastructure.

The PSTN based network 100 is well known in the arts, and allows direct connection for traditional voice telephones 201 and PBXs, such as PBX 3 220. Although these may use different interfaces to the PSTN (e.g., analog lines, ISDN interfaces, etc.), the PSTN seamlessly interworks the signaling and user traffic between the entities.

Another network carrying voice (and other forms of user traffic, such as video, multi-media, or data) is the H.323-based IP network 202. From a signaling perspective, the H.323-based IP network 202 is a development originating from the telephone industry (e.g., PBX manufacturers, telephone network providers, telephone equipment manufacturers, etc.). Specifically, H.323 was developed largely by adapting existing telephone signaling paradigms for establishment of voice and data calls over the Internet.

Figure 3:
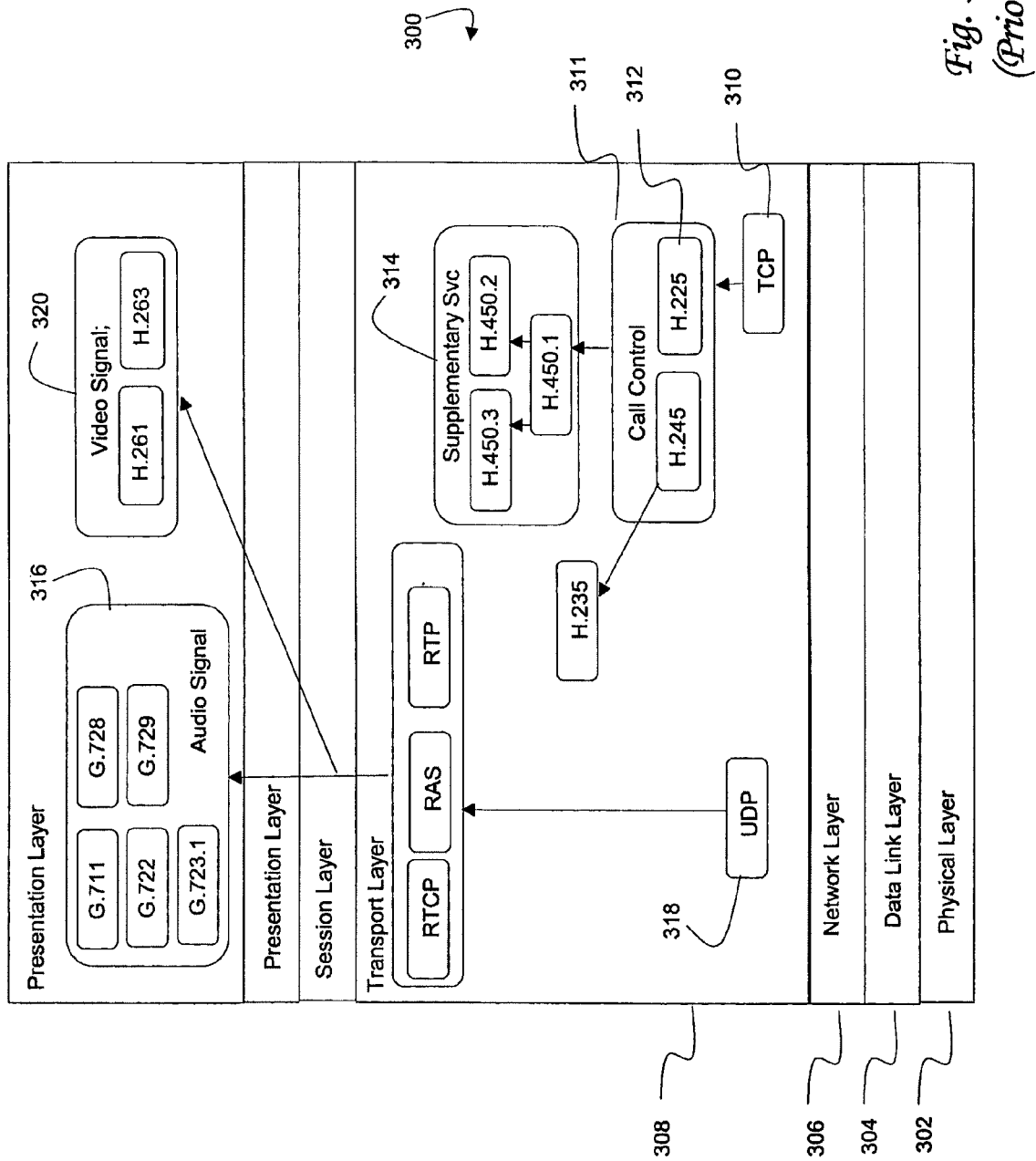
FIG. 3 illustrates the prior art of the H.323 suite of protocols.

The H.323 standard is an umbrella standard; i.e., it comprises a whole family of standards for call establishment on an IP network. Turning to FIG. 3, a brief overview of the H.323 protocol family 300 is provided. A significant aspect is that the signaling protocols are conveyed as higher level data to the lower three layers 302, 204, 306 of an IP network. Specifically, note that the physical layer 302, the data link layer 304, and network layer (e.g., IP) 306 convey the signaling messages using TCP 310. The call control signaling 311 is typically conveyed by TCP/IP. The signaling comprising call control 311 largely is found in H.225 312 and focuses on basic call control procedures. (H.245 involves multi-media calls.) The H.225 call control procedures are based on Q.931 ISDN signaling protocols. Similarly, the supplementary services 314 protocols are based on Q.932 and other ISDN based procedures.

The calls or sessions established involve data transfer between two users and is transported through the lower layers of the IP network 302, 304, 306. The data is carried by the UDP (connectionless) service 318 of the lower layers. This service provides a connectionless data transfer of audio and video data, which can be processed according to different audio codec standards 316 or various video data processing standards 314.

Turning back to FIG. 2, the H.323-based network can easily interwork with the PSTN, because the protocols and procedures are similar. Interworking components 212 can be used to facilitate interworking signaling between the PSTN network 100 and the H.323-based networks 202. Since most PBXs do not implement the H.323 protocols per se, an interworking device 208 is required. For PBXs employing ISDN or ISDN-like signaling, the interworking is fairly straightforward as not only are the basic call setup procedures very similar, but various supplementary services are similar as well. This facilitates feature transparency for the users.

The other basis for deploying voice over the Internet is a different standard originating from the Internet industry, specifically, by the Internet Engineering Task Force (IETF). The approach is not based on adapting existing telephone signaling protocols, but rather developing new signaling approaches using principles associated with the Internet. This signaling is called "SIP" (Session Internet Protocol), can be found in document IETF RFC 3261 or 2543. This protocol is an ASCII based protocol that establishes sessions between entities where the session can be a basic call or multi-media call. The user data is transferred over the Internet and are called sessions. Unlike traditional calls that are only directed to a telephone number, SIP allows calls to addressed using an URL. Mechanisms are defined for allowing calls to be addressed using telephone numbers as well. This requires interworking devices to interwork signaling and session data between the IP network and PSTN. In addition to basic call setup, the SIP protocol allows users to request additional services (although the term supplementary services is not used per se, this term is accurate.) However, the nature of supplementary services in an IP network is not limited to traditional telephony supplementary services. For example, in an IP network, a user can request changes to the session characteristics in the middle of a call—e.g., such as dynamically expanding the bandwidth required for the call.

Figure 4:
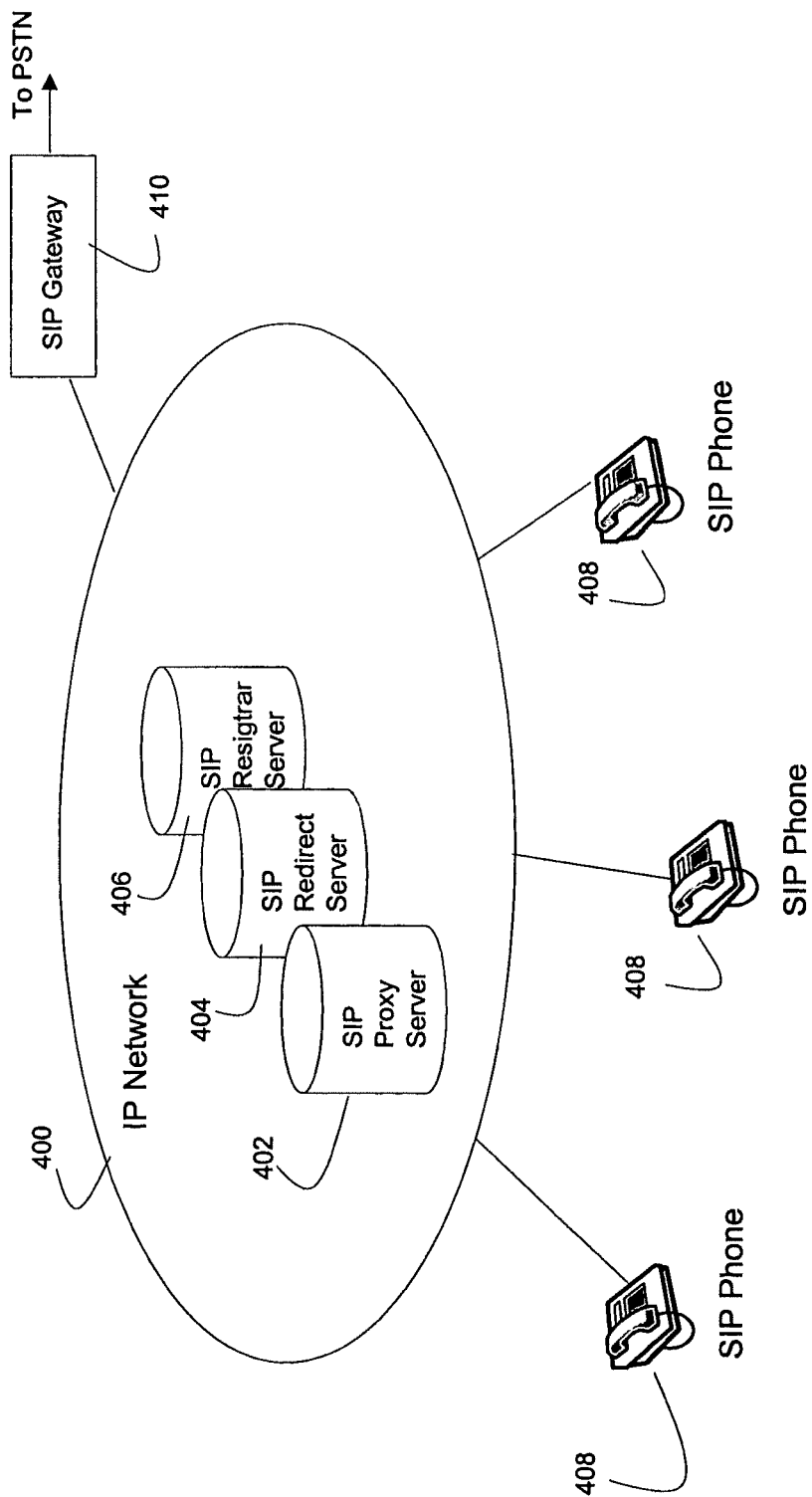
FIG. 4 illustrates the prior art of a SIP network.

FIG. 4 illustrates the prior art SIP architecture. In FIG. 4, an IP network 400 is used to provide interconnection between SIP Clients and SIP Servers. The SIP Clients include phones 408 and gateways 410. These act as peers to each other, and each can function in either a User Agent Server (UAS) or User Agent Client (UAC) mode, depending on whether the endpoint initiated the request or is receiving a request. Consequently, a client typically is capable of operating in either mode (though not typically simultaneously). The SIP Servers include a proxy server 402, a redirect server 404, and a registrar server 406. The proxy server 402 receives and processes the SIP requests from a SIP client, and forwards the request on the client's behalf. The redirect server 404 indicates information to the client about the next hop a message should take and allows the client to contact the next UAS directly. Finally, the registrar server 406 receives location information from a UAC, which allows clients to receive calls at various locations in the network. The servers may be integrated, or co-located in the network.

Returning back to FIG. 2, the SIP-based IP Network 200 is an IP network capable of handling calls, but using the SIP processing procedures. A SIP enabled PC and telephone 214 are illustrated as one embodiment of customer equipment that may be able to interface with the SIP network directly. Also depicted is a PBX 2 218 that requires an interworking device 216 in order to use the SIP network to make or receive calls. As evident, the SIP network 200 requires an appropriate interworking device 222, 210 for interworking with the PSTN 100 or an H.323 network 202.

FIG. 2 illustrates the complexity that rapidly arises when a traditional communications service provider attempts to interwork with IF networks. Currently, PSTN networks are ubiquitous and convey the majority of voice traffic. Separate data networks (e.g., EP Networks) co-exist for routing Internet and other data. In many cases, PSTN operators own and operate both type of networks side-by-side in the same service area. Even if PSTN operators do not own IP networks, they are, or will be, required to interwork with IP networks for carrying calls. As seen by FIG. 2, interworking voice traffic (as other types of traffic) is rapidly becoming complicated. Each new interface configuration further complicates interworking at an exponential basis. Specifically, adding a new interface configuration requires the new interface to interwork not only with the PSTN, but with H.323 and SIP-based networks. Even if standards exist for defining the new approach for interworking, the proliferation of new required interworking devices increases the complexity.

Another interface that a PSTN operator would have to accommodate with respect to interworking with IP networks was disclosed in FIG. 1, which depicted a private ISDN-based signaling network. Assume that the enterprise operating the PINX network in FIG. 1 desires to deploy an IP network, or utilize an existing IP network for tunneling the signaling between PINXs as well as conveying the user traffic. The PINX tunneling architecture can be overlayed onto FIG. 2, by using either (or both) the SIP based-Network or H.323-based IP network. For the service provider having deployed PSTN based, H.323-based, and SIP-based technologies, accommodating QSIG signaling provides further complications to the overall network architecture.

Figure 5:
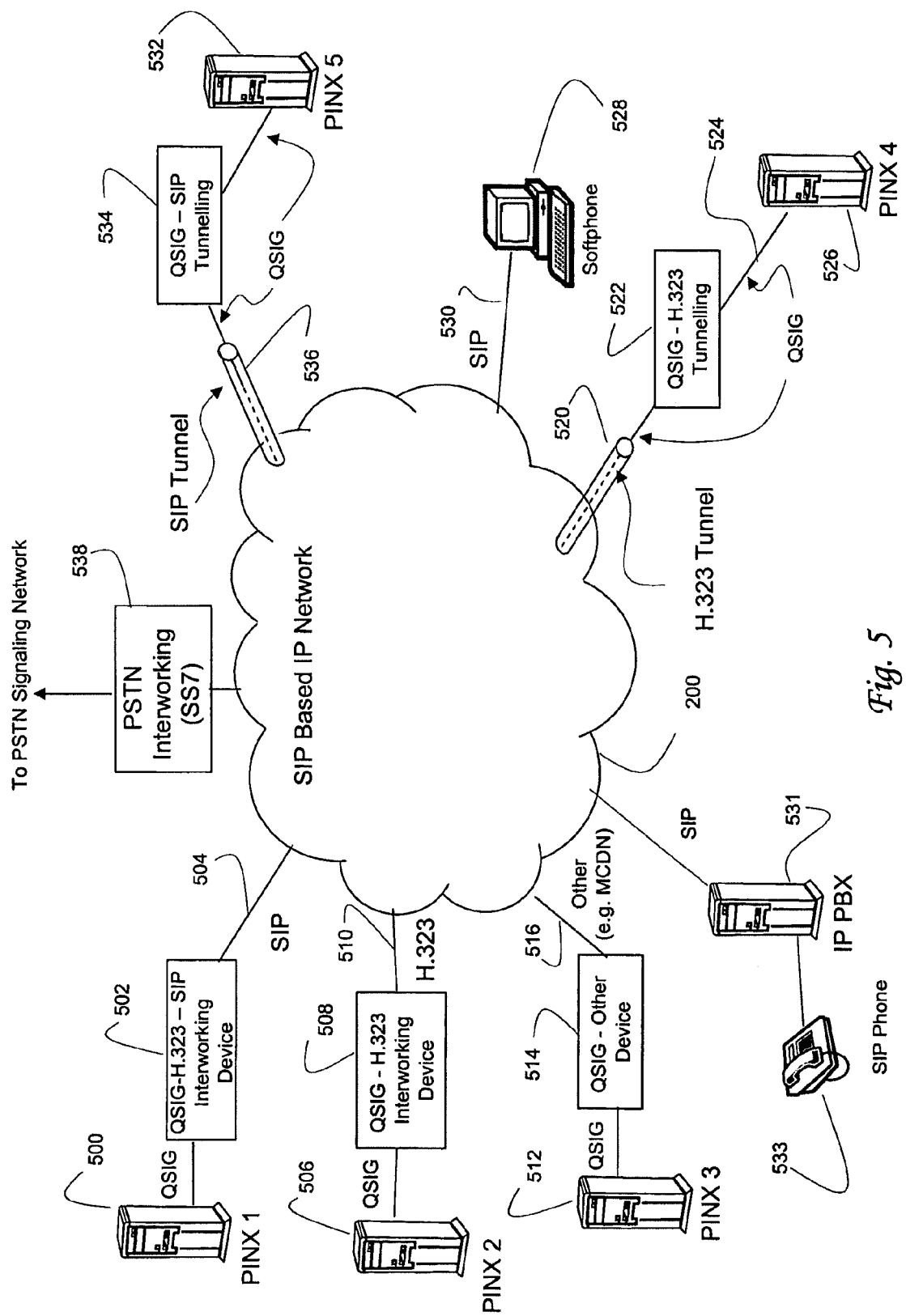
FIG. 5 illustrates various embodiments of signaling protocols and access methods according to the principles of the present invention.

The target solution for accommodating QSIG based private networks and other IP networks is illustrated in part in FIG. 5, which is based on a SIP-based network. By having a homogeneous network based on SIP, the core network can be simplified. In practice, as it will be seen, the SIP network may incorporate non-SIP protocols located at the 'edge' of the SIP network.

FIG. 5 serves to illustrate the various access methods for interworking QSIG based PINXs. Subsequent discussions will focus on the network aspects for accommodating each access arrangement. Further, the illustration of the embodiments of the present invention focuses on basic call setup, although those skilled in the art will understand the principles apply to supplementary services as well.

Perhaps one of the simplest access signaling arrangement is a native SIP signaling device, such as a PC-based softphone 528. This type of device originates and receives SIP signaling 530 without any protocol conversion or interworking. As such, this does not involve QSIG signaling, but is presented for the sake of completeness. A similar access arrangement is possible using an IP based PBX 531, that serves SIP based phones 533 as well as traditional phones or proprietary signaling based phones (not shown).

Another access arrangement based on SIP signaling 504 involves PINX 1 500. In this arrangement, PINX 1 500 uses QSIG signaling interfaces with an interworking device 502. In this embodiment, the interworking device 502 accepts QSIG signaling from the PINX and interworks the signaling to SIP 504 for interfacing with the SIP based network. The interworking from QSIG to SIP can occur in various ways. First, the QSIG signaling can be interworked to H.323 signaling, and then the H.323 signaling can be interworked to SIP. This could be accomplished using two separate interworking devices functionally operating in serial. Alternatively, the interworking device could interwork the QSIG signaling directly to SIP, effectively bypassing the conversion to H.323. In this access arrangement, the SIP network receives and processes SIP signaling similar as it would for any other native SIP signaling customer premise equipment.

The next signaling arrangement involves the SIP-based network receiving non-SIP signaling. PINX 2 506 interfaces with a H.323 interworking device 508. Because both QSIG and H.323 are based on Q.931 for basic call control, the interworking function is fairly straightforward. However, in this case, the SIP network receives H.323-based signaling 510. The SIP network must then process the request accordingly, and as it will be seen, this is done at the edge of the IP network so as to allow the core of the network remain SIP.

Other signaling arrangements are possible. For example, PINX 3 512 also has a QSIG signaling interface and interworks with a device 514 that converts the signaling to some other protocol 516. This other protocol could be a proprietary protocol, such as MCDN (Nortel Networks—Meridian Customer Defined Netework) protocol, or standard protocols such as MGCP (Media Gateway Control Protocol) or Megaco, which is also known as H.248. Similarly, the SIP network may interface with proprietary protocols and interwork these with the SIP protocol, which is typically done at the edge of the network as well. Other types of signaling arrangements are possible, including the use of proprietary signaling from the PINX, which is then interworked to a standard form of signaling by the gateway.

The above access methods illustrate the SIP network interfacing with a SIP, H.323, or other protocols. In contrast, another form of access methods are based on the concept of tunneling. Tunneling essentially encapsulates the signaling message, and conveys the messages at a higher layer. It is possible for this mechanism to be used to tunnel QSIG signaling from a PINX to the SIP network.

For example, one way of encapsulating a QSIG message is to use the H.323 protocol. While the H.323 protocol suite defines call control messages among its various capabilities, it also defines a way for QSIG signaling to be tunneled to a specified destination using call control messages. This is illustrated in FIG. 5 via PINX 4 526. In this access method, the QSIG signaling is received at a device 522 that encapsulates the QSIG signaling into H.323 messages (specifically, using H.225 messages). The H.323 message provides the tunnel 520 for conveying QSIG to the SIP network. This approach avoids interworking of messages in the device 522, and instead, locates the interworking of QSIG signaling in the SIP network. To process the QSIG signaling, the SIP network must 'de-encapsulate' the QSIG signaling from the H.323 message. This requires the SIP network to process both H.323 and QSIG signaling in addition to SIP signaling.

Similarly, the access method associated with PINX 5 532 is another embodiment of tunneling. In this arrangement, the PINX interfaces using QSIG signaling with a device 534 that encapsulates the QSIG messages. However, in this embodiment the tunnel is created using SIP signaling. The SIP tunnel 536 is terminated by the SIP network, where it extracts the QSIG signaling and interworks QSIG as required. Although the two embodiments illustrate tunneling QSIG in two types of protocols, the principles of the present invention allow other protocols to be used to tunnel the QSIG messages.

Once call signaling is converted to SIP signaling, the calls can be established and the process can be reversed for interworking the call at the destination end (if interworking is required). Many calls may be destined to entities that are not directly interfacing with the SIP network, but are served by the PSTN. In that case, the SIP network may interwork the SIP signaling with the PSTN. In this embodiment, an interworking device 538 converts the SIP signaling to SS7 and vice versa as appropriate.

It is important to distinguish between the noun "tunnel" and the verb "to tunnel" or, in another form, "tunneled". For example, a first protocol can be used to create a tunnel for conveying a second protocol. The first protocol encapsulates and conveys the second protocol and second protocol is tunneled by the first protocol. Thus, creating a tunnel in a protocol and tunneling a protocol refer to the different layers in the protocol architecture. This distinction between tunneling and being tunneled must be kept clearly in mind since it is possible that a given protocol can be used to tunnel the same protocol at a higher layer. In essence, a protocol can be replicated at multiple layers and be used to tunnel messages using the same protocol. itself.

Figure 6:
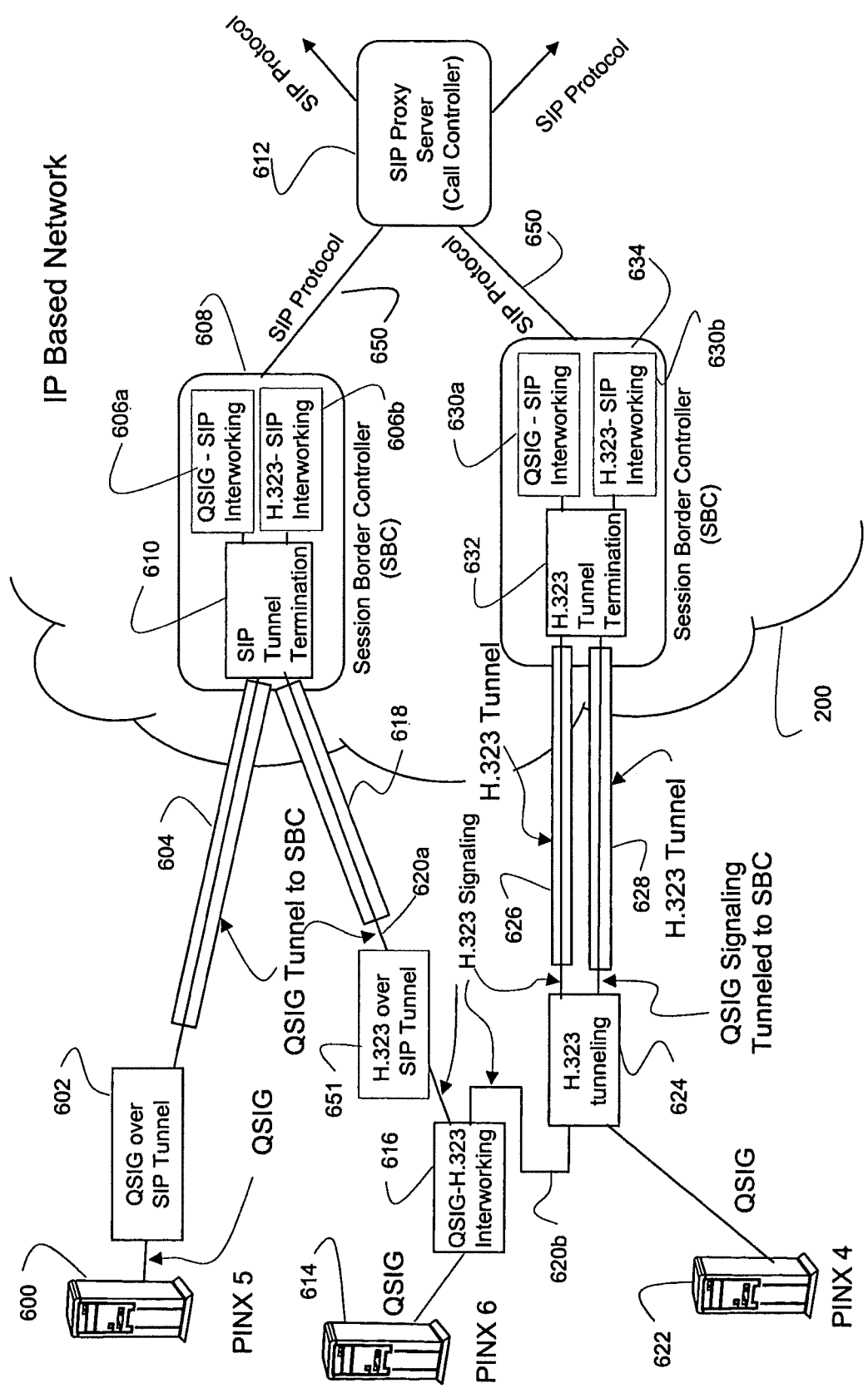
FIG. 6 illustrates various embodiments of signaling protocols and session border controllers according to the principles of the present invention.

Turning to FIG. 6, the variations for tunneling QSIG signaling are illustrated. In the first example, PINX 4 622 interfaces with a H.323 tunneling device 624. The tunneling device encapsulates the QSIG signaling and conveys it using a H.323 tunnel 628 to a Session Border Controller (SBC) 634 in the network. The SBC performs various functions, as will be discussed, but the two functions focused on herein are the H.323 tunnel termination 632 and the interworking function 630. The session border controller is also known as a session border gateway, or border controller. The interworking function in this embodiment can interwork QSIG to SIP 630a, or H.323 to SIP 630b.

Figure 7:
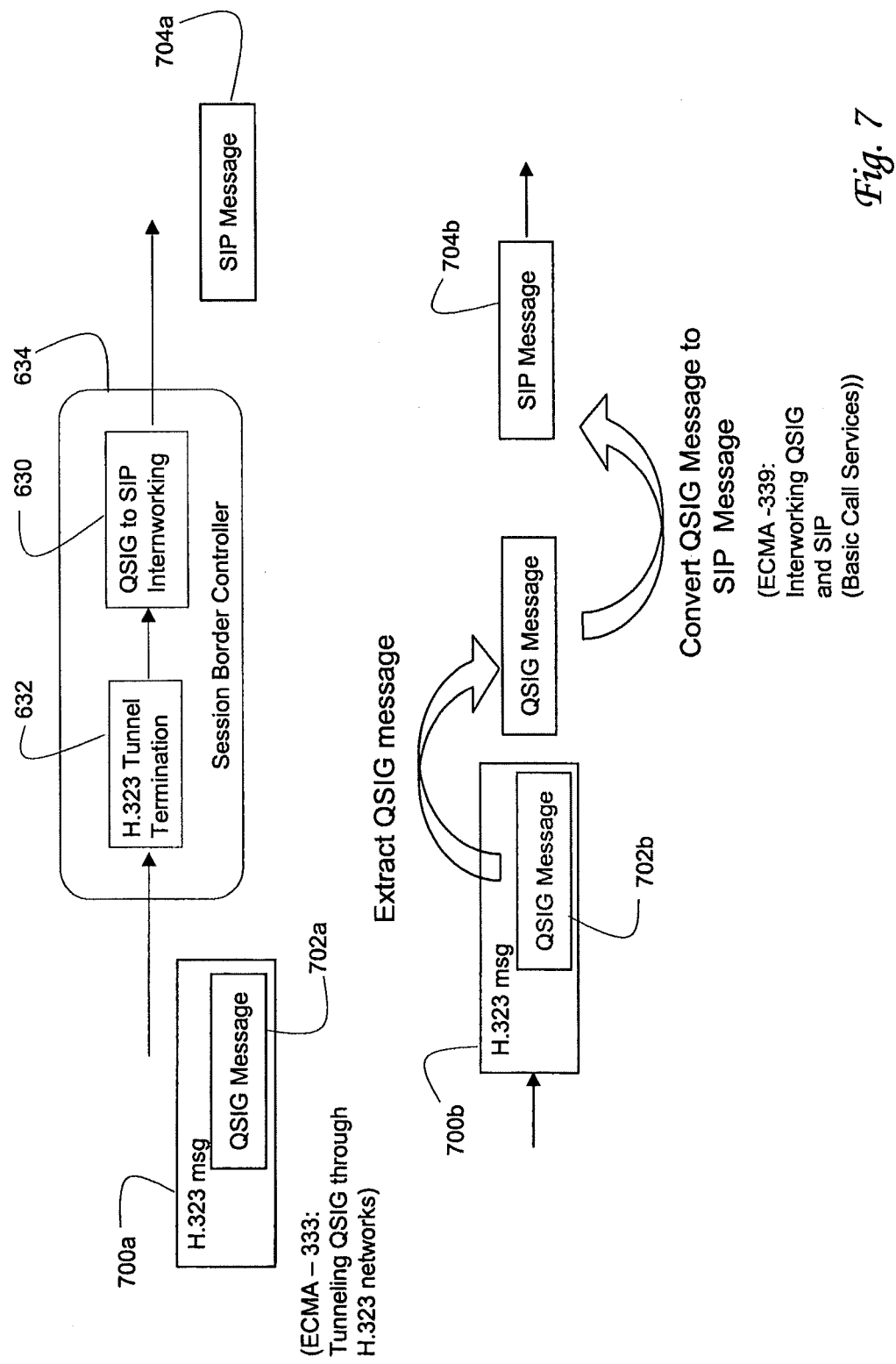
FIG. 7 illustrates one embodiment of processing QSIG messages tunneled via a H.323 message according to the principles of the present invention.

The QSIG tunnel termination in the SBC de-encapsulates the message and the interworking function converts the QSIG message to SIP. This is illustrated in greater detail in FIG. 7. Turning to FIG. 7, a H.323 message 700a is received at the SBC 634. The H.323 message contains within it a QSIG message 702a. The H.323 tunnel termination function essentially receives the H.323 message 700b and extracts the QSIG message 702b. This message is then passed to the QSIG to SIP interworking function which converts the QSIG message 702b to a SIP message 704b. The SIP message 704a is then sent from the SBC to the SIP Proxy Server (not shown).

The process for encapsulation or tunneling the QSIG message is defined in the European Computer Manufacturers Association (ECMA) standard EMCA-333, Private Integrated Services network (PISN)—Mapping Functions for the Tunnelling of QSIG Through H.323 Networks. This is also documented in the International Telecommunication Union (ITU) H.323 Annex M.1, Tunneling of Signaling Protocols (QSIG) in H.323.

Figure 7A:
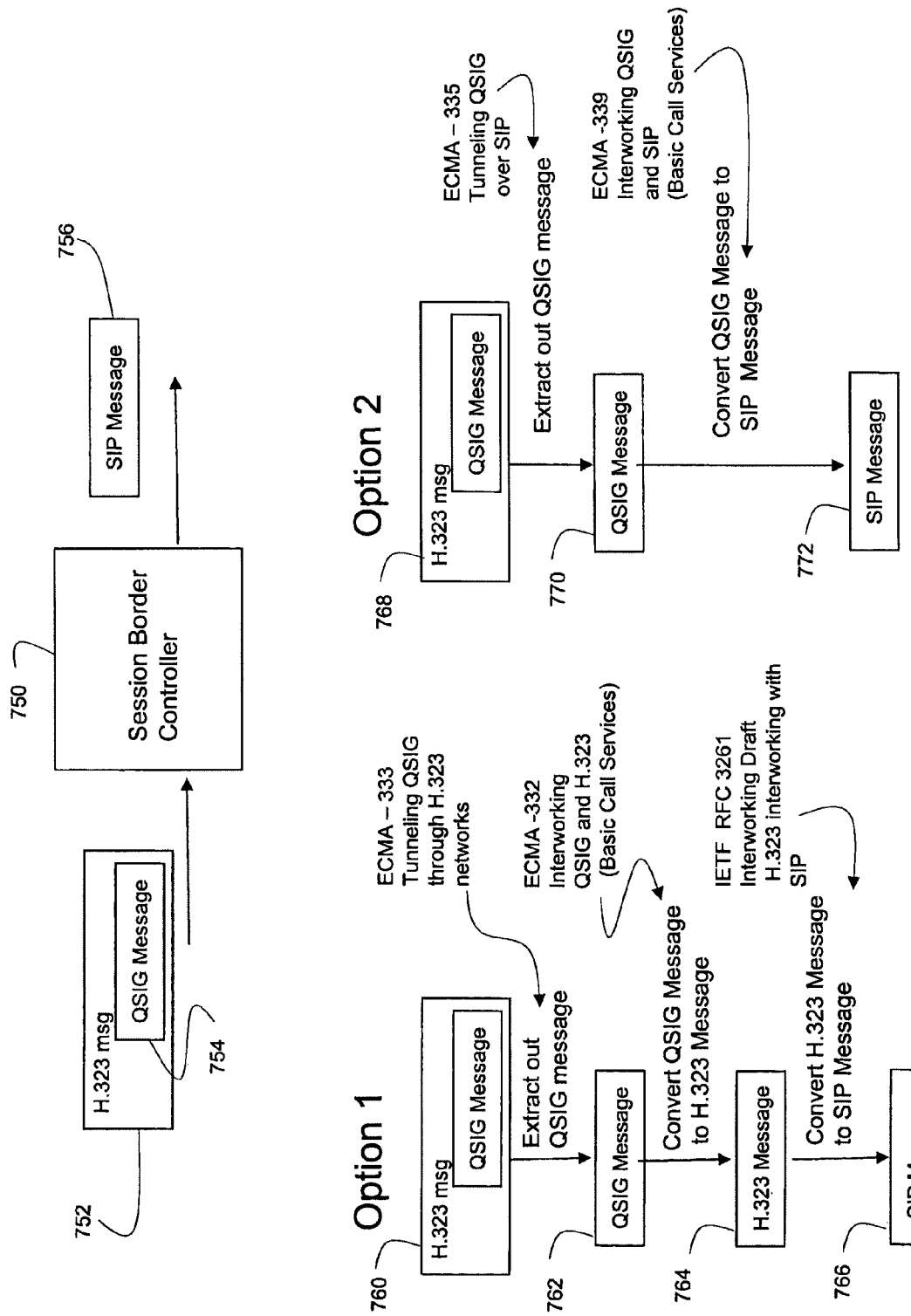
FIG. 7a illustrates two embodiments of processing QSIG messages to SIP messages according to the principles of the present invention.

The process of interworking the QSIG message to a SIP messages is further illustrated in FIG. 7a. Specifically, the process is illustrated for receiving a H.323 message 752 conveying a QSIG message 754 at a SBC 750 and producing the SIP message 756. In the first option, the H.323 message in step 760 is received, the QSIG message 762 is extracted using an ECMA-333 standard, the QSIG message is converted to an H.323 message in step 764 using the ECMA-332 standard, and the H.323 message in step 766 is interworked to SIP using the IETF RFC 3261 standard. Another option is to extract the QSIG message in step 768 from a SIP tunnel using the ECMA 335 standard, and map the QSIG message 770 directly to a SIP message using the ECMA-339 standard. Those skilled in the art will recognize that various alternatives can be defined to accomplish this.

Returning to FIG. 6, the process just discussed in FIGS. 7 and 7a (option 1) correspond to signaling from PINX 4 to the H.323 tunneling device 624 conveyed through the H.323 tunnel 628 to the SBC 634. An alternative flow involves PINX 6 614 generating QSIG messages that are mapped to H.323 at the interworking device 616 located on the customer premises. The operation of the interworking is specified in ECMA-332, Corporate Telecommunication Networks—Signaling Interworking Between QSIG and H.323—Basic Services. In this case, the H.323 call control message 620b is received by the H.323 tunneling device 624 and conveyed in a H.323 tunnel 626 to the SBC 634. This is an example of where the same protocol can be used to tunnel itself, although two different layers are obviously involved. The SBC, however, extracts H.323 signaling from the H.323 tunnel, and interworks the H.323 signaling to SIP. Once the SIP messages 650 are formed, they are communicated from the SBC to the SIP Proxy Server 612.

One distinction between the operation of PINX 6 614 and PINX 4 622 is that with PINX 4, the QSIG messages are conveyed to the SBC for conversion to SIP. In the case of PINX 6, the QSIG messages are converted to H.323 and then the H.323 messages are tunneled to the SBC for conversion to SIP. It becomes evident that a H.323 native protocol PINX could replace the combination of the PINX 6 614 and the QSIG-H.323 Interworking device 616.

Next, the access methods based on SIP tunneling are examined. In these access scenarios, the H.323 tunnel is essentially replaced with a SIP tunnel. This is embodied with the signaling associated with PINX 5 600. In this case the QSIG signaling is received by a QSIG-SIP tunneling device 602 and operates in accordance with the EMCA-335, Corporate Telecommunication Networks—Tunneling of QSIG Over SIP. This information is transmitted over the tunnel 604 to the SBC 608 where the QSIG tunnel termination 610 de-encapsulates the QSIG message. At that point, the QSIG message is passed to the interworking function 606*a* where the aforementioned procedures interwork the QSIG message to SIP. At that point, SIP messages are transmitted to the SIP Proxy Server 612.

Lastly, PINX 6 614 represents the situation where the QSIG signaling is received at an interworking device 616 that interworks the signaling to H.323 which then is received by an QSIG-SIP tunneling device 651. This is received by the SBC 608, specifically the SIP tunneling termination 610. This de-encapsulates the QSIG message, and then passes the QSIG message to interworking function 606*b* that interworks QSIG to SIP.

The access methods in FIG. 6 are not exhaustive, but illustrative of some of the more common access methods. Other variations are possible, and are within the scope of the present invention.

For example, each of the access arrangements of FIG. 5 along with the interworking functions of the SBC in FIG. 6 can be combined to provide various end-to-end interworking scenarios. Some of the options are illustrated in FIG. 6*a*-6*d*. In FIGS. 6*a*-6*d*, various PINXs are illustrated (e.g., 651), that may have a gateway function (e.g., 652) converting or interworking QSIG at a user-network interface 690*a*. The intra-network signaling between the SBC and a SIP Proxy server is SIP based, and at the remote user-network interface 690*b*, the premises may again incorporate a gateway (e.g., 656) and a PINX (e.g., 657). Since there are various combinations, only a few will be discussed.

Turning to FIG. 6*a*, the PINX 651 communicates using QSIG signaling to a gateway 652. Although the gateway is shown as a separate entity, the functionality could be integrated into the PINX. The gateway 652 in turn interfaces to a network at a user-network interface 690*a* using a SIP tunnel that is established from the initial ingress SBC 653 to the egress SBC 655, through a gateway 656 at the remote premises, which then conveys the QSIG signaling to the remote PINX 657. Although a SIP proxy server is not shown in FIG. 6*a*, one was used to establish the SIP tunnel through the network. Thus, the core network functions are SIP-based.

In FIG. 6*b*, the PINX 661 again uses QSIG signaling with the gateway 662, but in this case, the gateway interfaces to the SBC 663 using an H.323 tunnel. The SBC terminates the tunnel and interworks the QSIG to SIP procedures. Thus, SIP procedures are used between the SBC 663, the SIP Proxy Server 664, and the remote SBC 665. In this embodiment, a SIP based tunnel is established between the remote SBC 665 and the gateway 666, which then interworks the SIP signaling to QSIG for the PINX 667.

In FIG. 6*c*, the PINX 671 again uses QSIG to signal with the gateway 672, which uses an H.323 tunnel to convey the QSIG to the SBC 673. The SBC uses SIP signaling to communicate with the SIP Server 674, the remote SBC 675, which communicates with the remote gateway 676 using SIP. The remote gateway, in turn, interworks the SIP signaling to H.323 with the remote PINX 677.

Finally, in FIG. 6*d*, the PINX 681, uses some other signaling protocol, whether standardized or proprietary to communicate with a gateway 682 which conveys the signaling over a SIP tunnel to the SBC 663, which interworks the signaling to SIP. Thereafter, the SIP signaling interacts with the SIP Proxy Server 684, as does the SIP Proxy Server with the remote SBC 685. In this embodiment, the remote PINX 687 communicates using SIP to the SBC 685.

It should be apparent that various access methods and various SBC functionalities can be used to facilitate communication between the originating and remote PINXs. However, in the previous embodiments, the core network procedures remain SIP based, which provides a homogeneous network signaling architecture.

Figure 8:
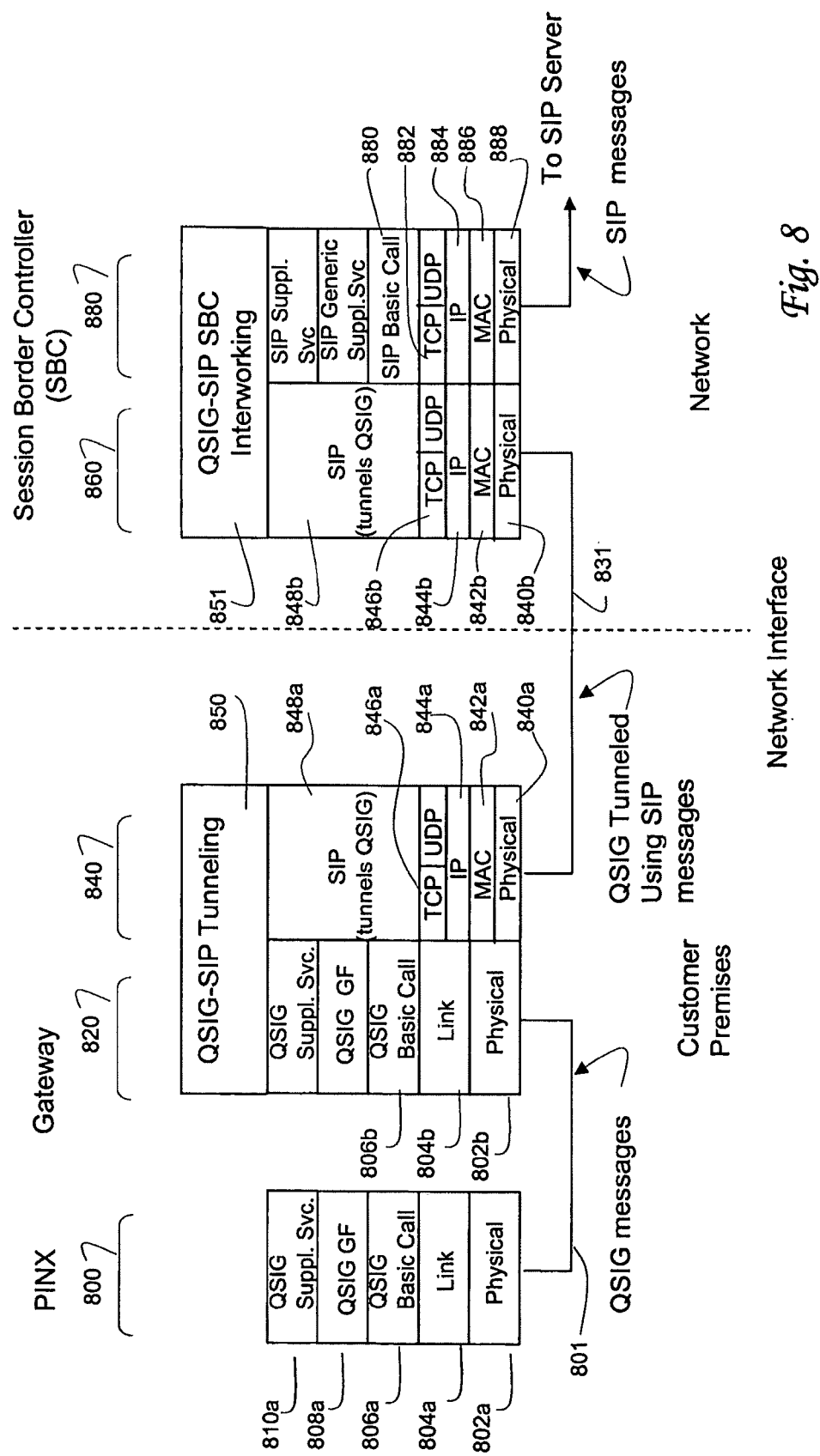
FIG. 8 illustrates one embodiment of a protocol stack associated with the principles of the present invention.

The protocol architecture for the various access methods are presented next. Turning to FIG. 8, the protocol architecture corresponding to the transfer of information by PINX 5 600 of FIG. 6 is shown. In FIG. 8, protocol stacks are illustrated corresponding to the PINX 800, the protocol stack 820 of the Gateway interfacing with the PINX, the protocol stack 840 of the Gateway interface with the SBC, the protocol stack 860 of the SBC interfacing with the Gateway, and finally, the protocol stack 880 of the SBC interfacing with the SIP Proxy Server.

Each of these protocol stacks represents the processing of data transmitted from element to element. Again, the present embodiments focus on basic call setup, although the principles apply to invocation of supplementary services. Assuming a basic call setup is initiated from the PINX to the SIP Proxy Server, the message flow begins with in the QSIG Basic Call layer 806*a*. The higher layers associated with supplementary services 808*a*, 810*a* are shown, but only for completeness, as the example will focus on a basic call establishment.

The QSIG message is passed down to the link layer 804*a*, and then down to the physical layer 802*a* which is then transmitted over the physical facility 801 (e.g., a cable). This is received at the gateway, and the messages are received by the corresponding physical layer 802*b*, link layer 804*b*, and QSIG basic call control layer 806*b*. The call request is then processed by the QSIG-SIP tunneling function 850*a*. (Recall that since we are not dealing with supplementary services, the QSIG Supplementary Service and QSIG Generic Functions for supplementary services are not involved.)

The QSIG-SIP tunneling process 850 then passes the QSIG message to the SIP layer 848*a* that encapsulates the QSIG message in the appropriate SIP message. This SIP message is then passed down to the TCP layer 846*a*, then to the IP layer 844*a*, then to the MAC layer 842*a*, and then to the physical layer 840*a* for transmission over the physical facility 831. It is at this point that the user-network interface is crossed and the data is now processed by the network provider.

The diagram illustrates that two IP network services can be used—either TCP or UDP capabilities. Typically, for signaling, the TCP layer is used, but the UDP alternative is illustrated for the sake of completeness.

The data is received by the Session Border Controller, and the protocol stack 860 mirrors that of the gateway 840 by definition. The message is received at the physical layer 840*b*, passed up to the MAC layer 842*b*, passed up to the IP layer 844*b*, to the TCP layer 846*b* layer, and then to the QSIG Tunnel procedures 848*b*, which de-encapsulates the QSIG message. The QSIG message is then passed up to the interworking function 851 that interworks the QSIG message to the proper SIP message(s). The appropriate SIP messages are then generated by the SIP basic call control layer 880, which passes the SIP message down to the TCP layer 882, which in turn passes it down to the IP layer 884, then to the MAC layer 886, and then to the physical layer, where it is transmitted to the SIP Proxy Server.

Figure 9:
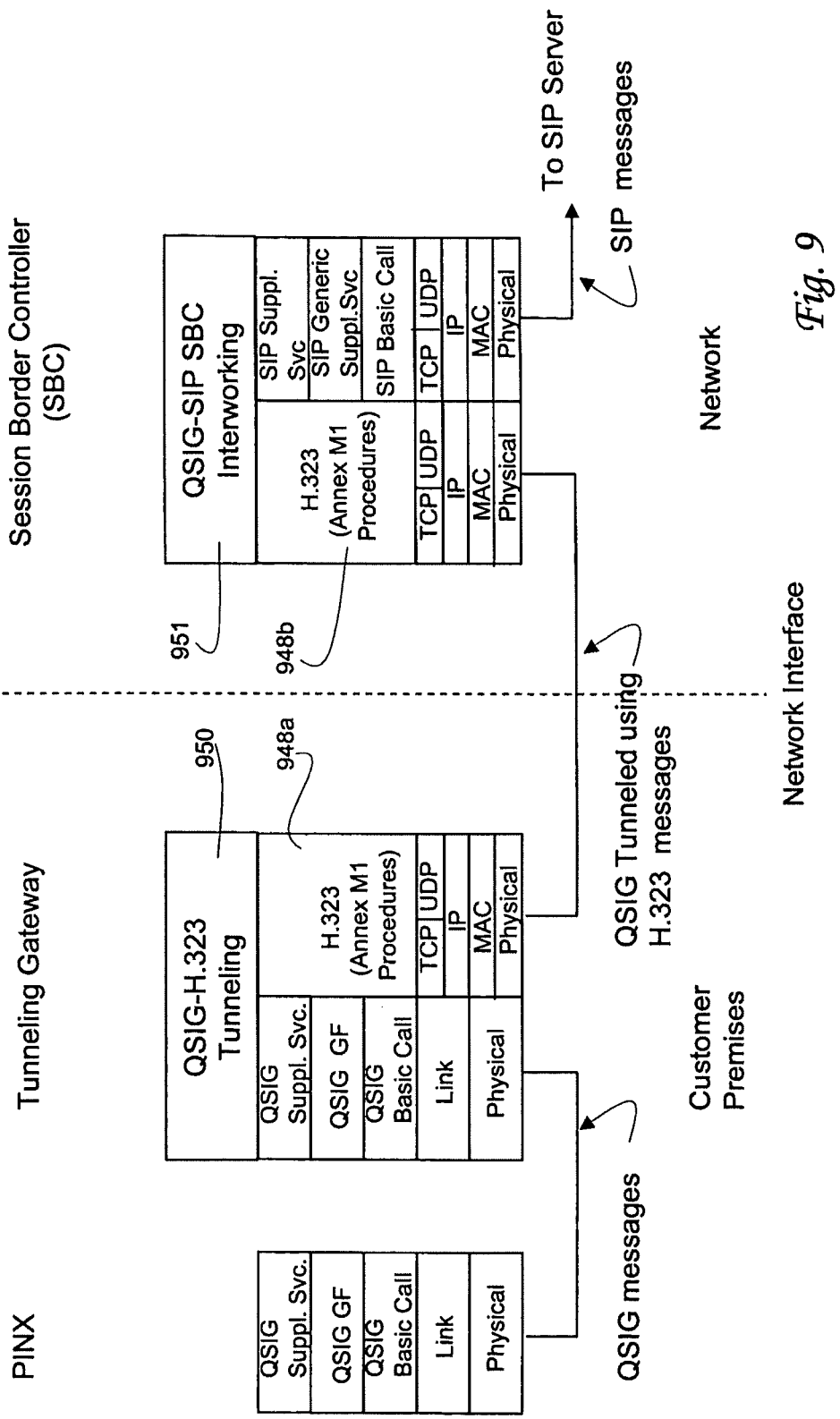
FIG. 9 illustrates another embodiment of a protocol stack associated with the principles of the present invention.

FIG. 9 illustrates another embodiment of the protocol stacks where the QSIG protocol stacks are tunneled using the H.323 protocol. This protocol architecture corresponds to the message flow from PINX 4 622 of FIG. 6 using the H.323 tunnel 628 to the SBC 634. The message in FIG. 9 flow is largely the same as in FIG. 8, and there is no need to replicate the description common to FIG. 8. However, in this embodiment illustrated in FIG. 9, the QSIG message is passed to the QSIG-H.323 tunneling function 950 that determines that the QSIG message is to be encapsulated in H.323 protocols (specifically, H.225 call control protocols), and sends the QSIG message down to the H.323 protocol 948*a* using the Annex M1 procedures to encapsulate the QSIG message. The message is passed down the protocol stack until it is received by the corresponding procedure 948*b* in the SBC. There, the QSIG message is de-encapsulated, and passed to the QSIG-SIP interworking function 951. The process maps the QSIG message to the appropriate SIP message, and it is passed down the protocol stack and transmitted to the SIP Proxy Server.

Figure 10:
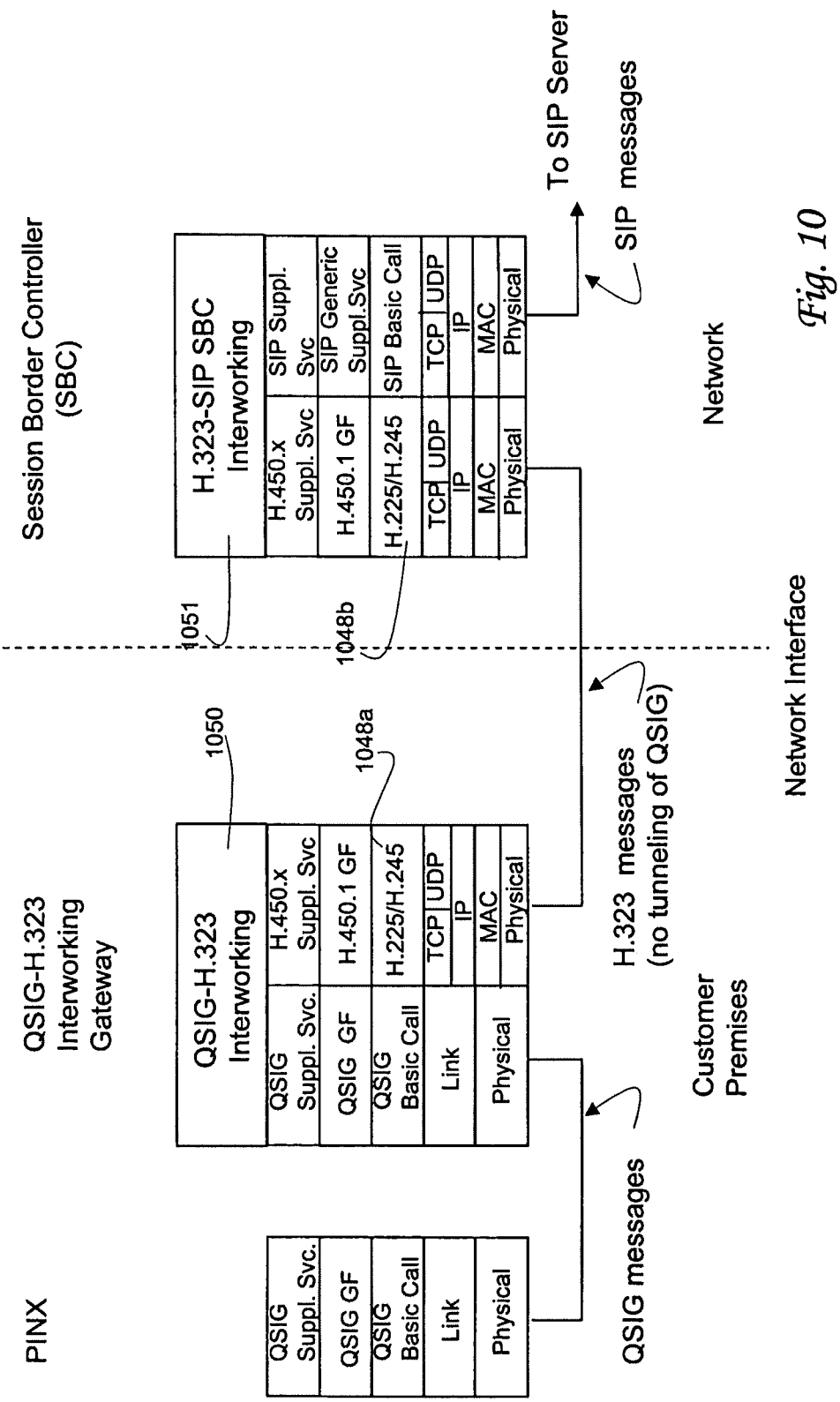
FIGS. 10 and 10a illustrate further embodiments of a protocol stack associated with the principles of the present invention.

Another embodiment corresponds to the signaling arrangement of PINX 2 506 in FIG. 5 that did not use tunneling. In FIG. 5 the PINX 2 506 interworks with a QSIG—H.323 interworking device 508 that essentially converts the QSIG to H.323 signaling, and then interfaces with the SIP Based IP Network 200 using H.323 510. This protocol stack is illustrated in FIG. 10, which also illustrates the supplementary service protocols. Again, the message flow for FIG. 10 is similar to that of FIG. 8, so only the major distinctions are discussed. The message is passed from the PINX to the QSIG-H.3232 Interworking Gateway. The QSIG-H.323 Interworking 1050 function determines that the QSIG signaling is to be interworked to the appropriate H.323 protocol (which for call control is the H.225 protocol 1048*a*). This is sent over the TCP/IP network to the SBC. The SBC has the corresponding protocol stack and upon processing the H.323 call control message, it invokes the H.323-SIP interworking function 1051 which results in a SIP session establishment message to be created. This is passed down the protocol stack and transmitted to the SIP server.

Figure 10A:
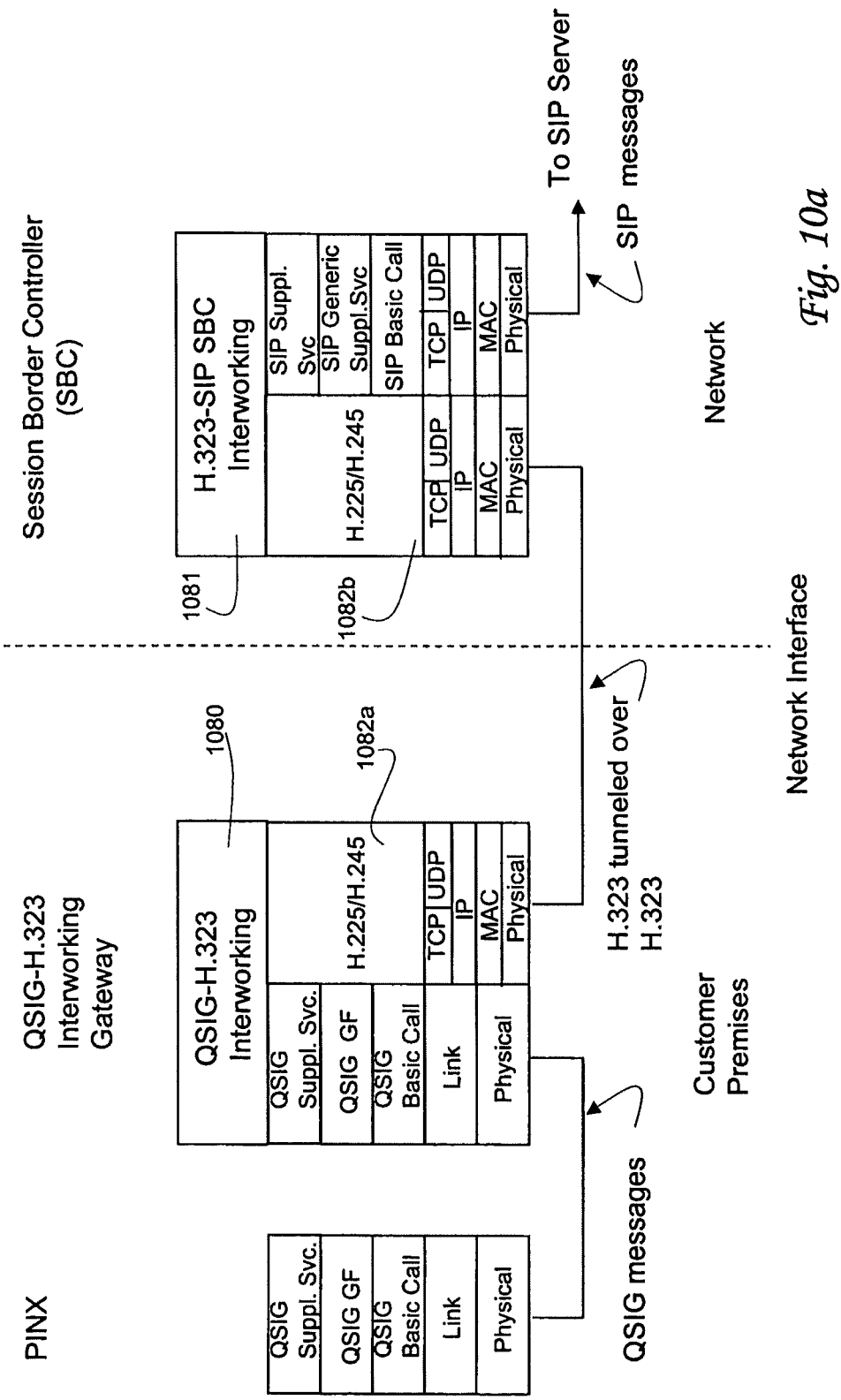

Finally, FIG. 10*a* illustrates another embodiment that correspond to the PINX 6 614 of FIG. 6. In that embodiment, the PINX sends a QSIG message to be interworked with H.323 616, which is then tunneled over H.323 626. In FIG. 10*a*, the QSIG messages are received at a gateway where the interworking function converts the QSIG message to a H.323 message. That H.323 message is then tunneled using H.323 (specifically, H.225 1082*a*). The H.323 tunneled over H.323 is conveyed to the SBC where the tunnel is terminated 1082*b* and the H.323 message is interworked to SIP 1081.

Figure 11:
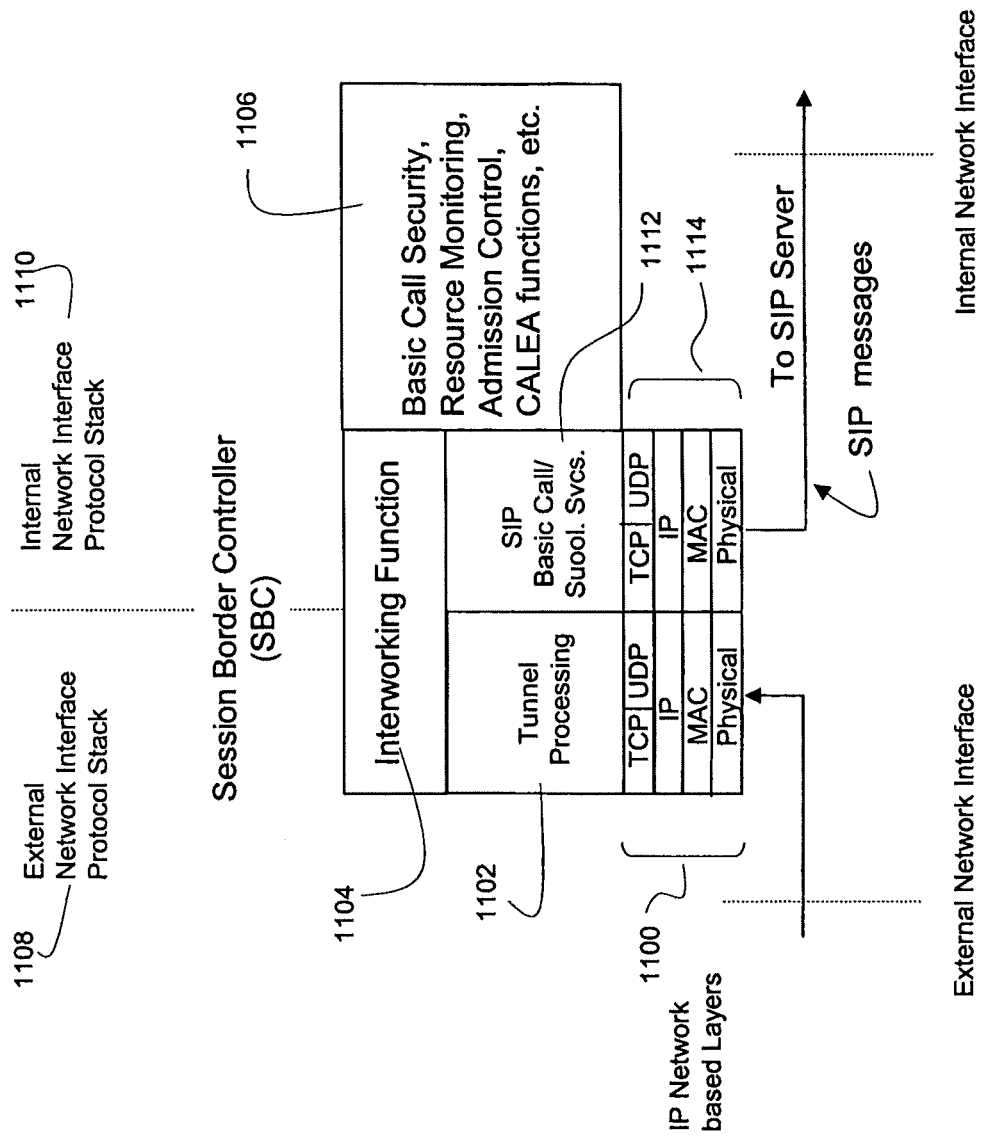
FIG. 11 illustrates one embodiment of the functionality associated with the session border controller according to the principles of the present invention.

FIG. 11 illustrates the protocol stacks of the SBC in greater detail. It is evident from the various embodiments previously illustrated, that the SBC can be viewed as having two protocol stacks. One stack is associated with the user-network interface, or the external interface 1108. The other protocol stack is associated with the network-network interface, or the internal network interface 1110. One advantage of the aforementioned architecture is that the internal network architecture protocol stack is common for the various embodiments. Specifically, the SIP basic call procedures 1112 and the lower IP network layers 1114 are common to the internal network interfaces of the various SBCs. This allows the core of the SIP network to be homogeneous. The external network interface protocol stack also shares a common set of the four lower layer protocols 1100 regardless of the signaling and access method from the customer's premise. The layer above the TCP/IP layer, e.g. "layer 5" 1102, handling call processing does vary according to the needs of the particular PINX signaling arrangement and method for transporting the signaling. In some embodiments, the PINX may have the H.323 tunneling functionality incorporated into it, so that the protocol layer 1102 is a H.323 tunneling terminator. In other embodiments, the PINX may support a SIP tunnel, so that the layer 5 protocol 1102 terminates a SIP tunnel. The interworking function 1104 is based on the signaling and access method, and functions to bridge the different layer 5 protocols to the SIP call control. However, because this interworking function is isolated to the SBC and is not required in other core SIP network elements, the impact of handling other signaling protocols is localized to the SBC and new protocols and access methods can be readily handled by modifying the interworking function 1104 in the SBC.

Although FIG. 11 is discussed in terms of call control, the same principles apply to the invocation and control of supplementary services. The layer 5 protocol module 1102 facing the external network interface can process supplementary service requests and the interworking function 1104 interworks the service with the appropriate SIP procedures 1112. For supplementary services defined both in the access method and in SIP, the standard interworking procedures may be performed. For features not transparently defined across the access signaling protocol (e.g., QSIG) and in SIP, proprietary features in SIP could be invoked. Alternatively, the signaling originating devices (e.g., PINXs) could establish an end-to-end tunnel for feature interworking. It is possible that some features available on a PINX will not transparently interwork with a SIP network until such interworking is defined by the appropriate standards body.

Regardless of the signaling that is interworked to SIP by the Interworking Function (IF) 1104, the IF needs to know what type of signaling is going to be received from the users' equipment. Or, for a specific example, if a tunnel is used to convey signaling from a PINX, how does the SBC know what signaling the PINX is using? It could be QSIG, or it could be a proprietary version, or some other standard signaling. There are several ways in which the SBC can know what signaling protocols are being used. In the first approach, the SBC is provisioned with the information prior to service establishment. Thus, the SBC is told that the tunnel terminated conveys QSIG. Another approach involves the user signaling to the SBC when establishing the tunnel, that the tunnel is to be to convey signaling. Yet another approach involves the user interacting with a SBC management system (e.g., a web server or other system) and configuring the interface parameters, and the management system then in turns notifies the appropriate SBC. In the first approach, such a system may be used by the network operator to provision the SBC.

The SBC is a new class of network devices, and the functions it performs 1106 are embodied in its name 'session', 'border', and 'controller.' First, the device is intended to be deployed at the edges, or borders, of IP networks. In FIG. 6, the SIP-based IP network 200 interfaces with various private networks that may be IP based as well. The SBC performs various functions that are best suited to be performed at the border between the two IP networks. By deploying the functions described below, the processing is distributed to the edges of the network, and the use of separate SBCs facilitates the potentially large processing requirements. Deploying various functions at the border of the network is preferred in many cases. For example, one of the functions performed by a SBC may involve security. It is desirable to prevent unauthorized users from accessing a network at the point of entry to the network, not at a later point. In another example, the SBC performs session management. In the SIP environment, 'sessions' refers to any user communication, be it voice, video, multi-media, data or other. It is similar to a "call" as used in the H.323 protocol context. It is also preferred to manage sessions at the point of entry into a network.

Finally, the last set of functions performed by the SBC is control; specifically control of both signaling and sessions. As discussed, the SBC terminates the signaling traffic originating from the other IP network (in this case, the PINX). The SBC may terminate a tunnel carrying the signaling and interworks the QSIG signaling to SIP as necessary. The SBC does not simply perform the interworking function 'blindly', but ensures that the signaling only from authorized users is interworked with SIP. This requires the SBC to examine layer 5 information for security aspect. This is unlike the security functions performed by routers, which by their nature only examine information at layer 3.

In addition, the SBC performs resource monitoring and admission control. A request for signaling is used to establish a session, which is fundamentally a request by a user for network resources. It does not make sense for the network to process the request (even if it is from an authorized user) if the network resources are unavailable. Further, if the SBC processes calls without determining network resources are available, acceptance of the call may simply further aggravate the availability of resources required in the SIP network. Consequently, before the SBC interworks the session or call request, it should determine if the required resources are available to support the request, and if not, deny the request.

The SIP provider may limit users to certain levels of resource requests using pre-establish service level agreements (SLAs). A SLA is akin to a subscription or service agreement, and service providers can use these to allocate finite resources in accordance with previously established agreements. As a simple example, a SIP provider providing voice-only service to a user would not expect, nor allow, the user to request extra bandwidth for transfer of high definition video. In essence, the user would be requesting resources that they were not entitled to. However, if the user has a SLA entitling them to using both voice and video services, then such a request should be processed by the SIP network provider. Further, the SIP provider may provide other services that by their nature are required to be individually controlled and administered. Thus, the interworking function in the SBC does not simply "blindly" map messages, but may identify the request, identify the user, determine whether the request is compatible with the service profile for the user, determine whether other network resources are available to fulfill the request, and then interworks the message to SIP as appropriate.

In regards to determining the ability of the SBC and the network resources available for processing a session, the SBC must give special consideration for handling high-priority QSIG calls, e.g., emergency ("911") dialed calls. In such cases, signaling and session resources must be allocated for handling emergency calls. Thus, the SBC needs to determine how to handle such calls with respect to existing calls, as well as determine the level of resources available to the routers for handling such sessions.

Another example of a function 1106 performed by the SBC is law enforcement ordered wiretapping (as required by the Communications Assistance for Law Enforcement Act of 1994—"CALEA"). The SBC, as the initial point of entry into the SIP provider (or the point of exit), is well suited for deployment of CALEA-related functions. Thus, upon receipt of a QSIG SETUP message, the SBC will determine whether any CALEA processing is associated with the call, and if not, the call is processed as normal. If CALEA processing is required, then appropriate notification and other CALEA related procedures are invoked.

In addition to admission control, the SBC is a logical location to perform measurements for accounting purposes. Thus, the SBC may record Automatic Message Accounting (AMA) data, which details call related information that may be used for statistical analysis as well as billing purposes. For example, services that are billed on a message usage basis (e.g., kilobytes of data transferred or session duration) require AMA or AMA-like records generated by the SBC and possibly stored in the SBC (or in a database directed by the SBC) that are processed by the SIP provider to render the user a bill.

Some of these functions are illustrated in FIG. 11 as being associated with the SBC, and they necessarily interact with the Interworking Function 1104 and the SIP Basic Call Protocol handler 1112. The operation of these functions are typically not defined by the SIP or QSIG protocol as their implementation is internal to the SBC.

Figure 12:
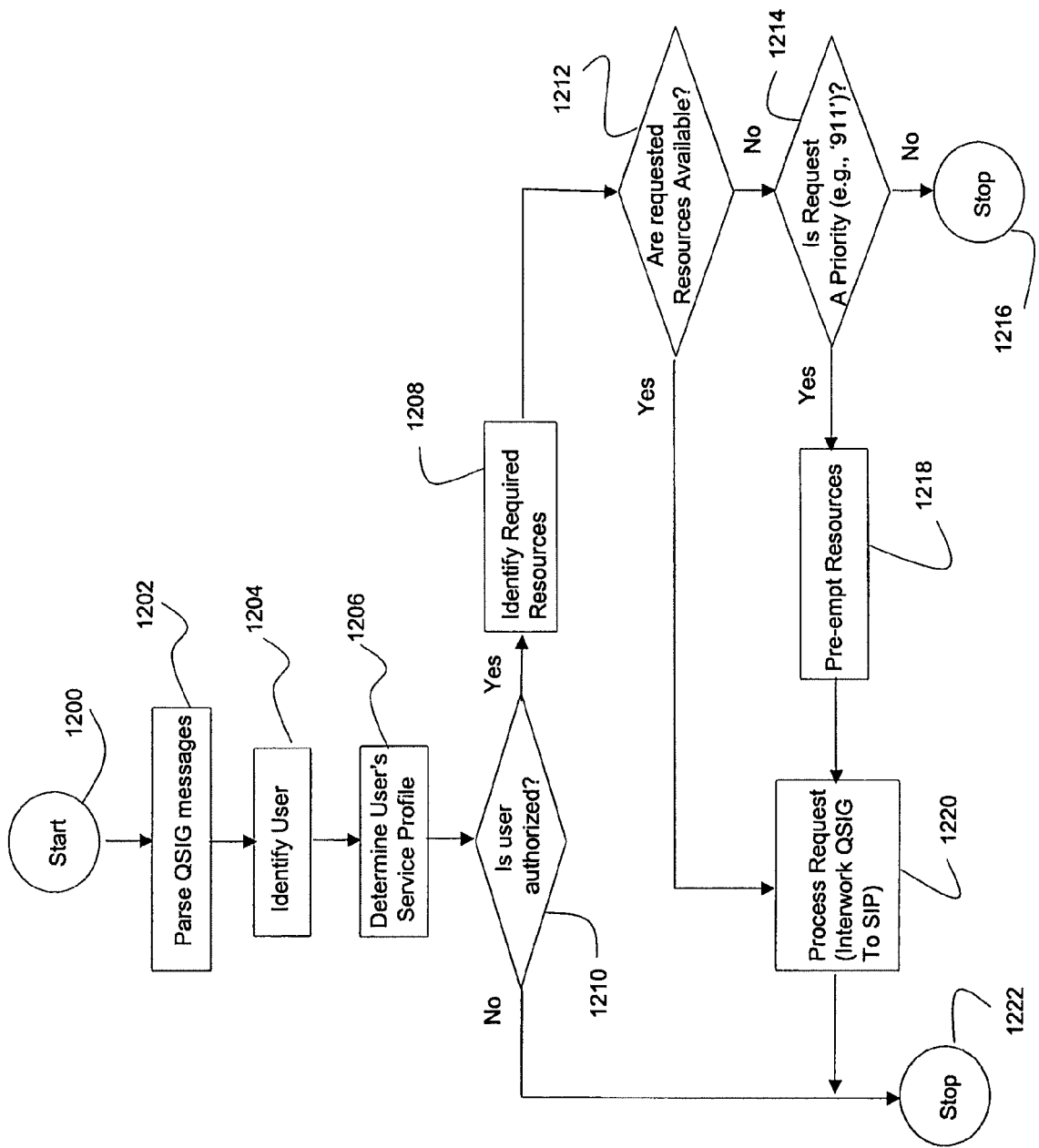
FIG. 12 illustrates one embodiment of the processing of signaling in the session border controller according to the principles of the present invention.

The processing of signaling in the SBC is embodied in FIG. 12. The process begins at step 1200 with the SBC receiving a QSIG message using any of the aforementioned techniques. The SBC parses the QSIG message in step 1202 to identify the information contained in it, and identifies the user at step 1204 making the request. Next, the SBC retrieves the user's service profile 1206 which contains any relevant SLA information. At step 1210 the user is tested to determine whether they are authorized for the request. If not, the process stops 1222. If the user is authorized, then the SBC identifies any network or element resources 1208 (e.g., bandwidth) required to process the request. The network then determines at step 1212 whether the resources are available, and if they are, the QSIG request is processed at step 1220, which involves interworking the QSIG message with the SIP protocol. If the necessary resources are not available at step 1212, the SBC determines whether the request is associated with a higher priority for resources 1214 (e.g., an emergency call). If so, then the resources are obtained in step 1218, which may involve pre-emption from their current allocation. The QSIG message is then processed in step 1220. However, if resources are not available and the request does not warrant any further priority 1214, then the processing is terminated 1216.

Figure 13:
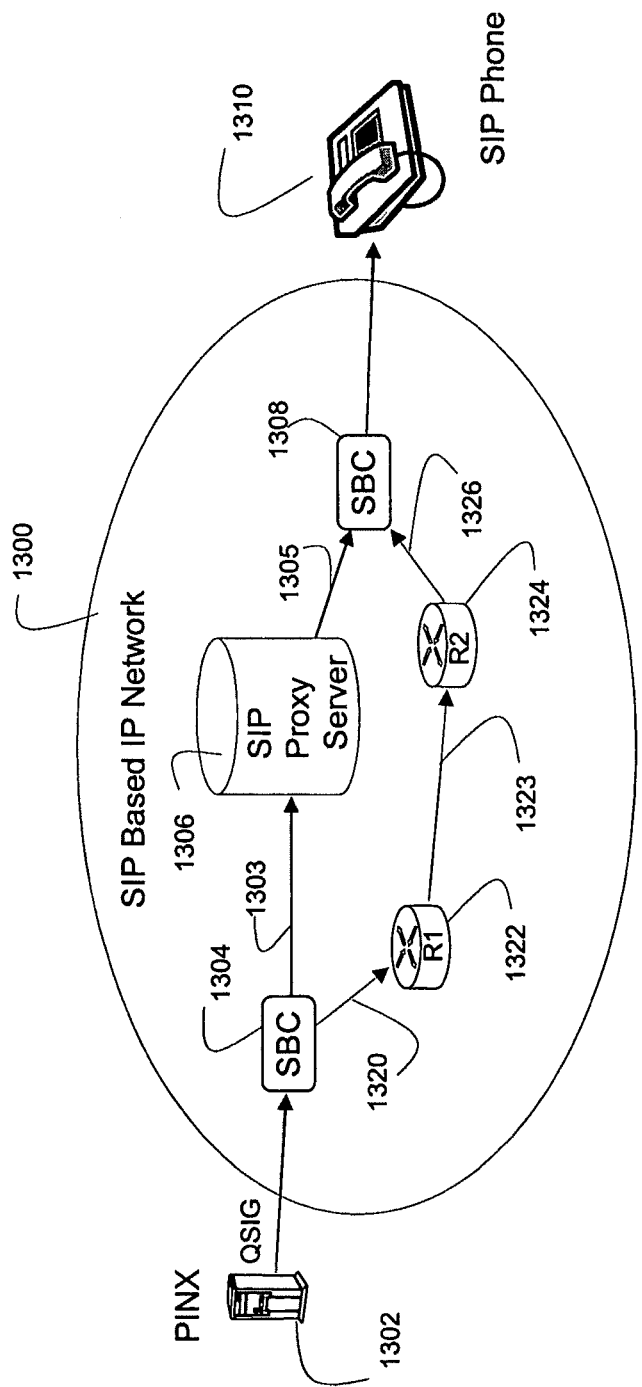
FIG. 13 illustrates one embodiment of a network providing a call established between two points according to the principles of the present invention.

FIG. 13 illustrates an end-to-end instance of communication establishment. In this embodiment, a PINX 1302 originates a QSIG SETUP message for requesting a call to the destination 1310 using a SIP based IP Network 1300. The QSIG message is transported using a tunnel to the SBC 1304. Various routers and network elements may be involved in transporting the signaling request to the SBC, but these are not shown, nor required to illustrate the principles of the present invention. The SBC processes the signaling as described, and initiates a SIP message to the SIP Proxy/Server 1306. The SIP Proxy/Server in turn generates a SIP message to the SBC 1308 serving the destination 1310. Recall that these paths represents logical signaling paths, which are distinct from the session traffic. Session traffic may be routed using Router 1 1322 and the links to Router 2 1324. The SBC 1308 then establishes the session with the destination 1310, which in this embodiment is a PC enabled 'softphone.' In other embodiments, the router functionality can be integrated into the SBC.

In FIG. 13, the processing of the initial QSIG message by the SBC 1304 may require the SBC to access data regarding the available network resources. This may require, or be accomplished by, the SBC communicating with the appropriate network entities, such as Router 1 1322, in order to ascertain the availability of network resources.

Figure 14:
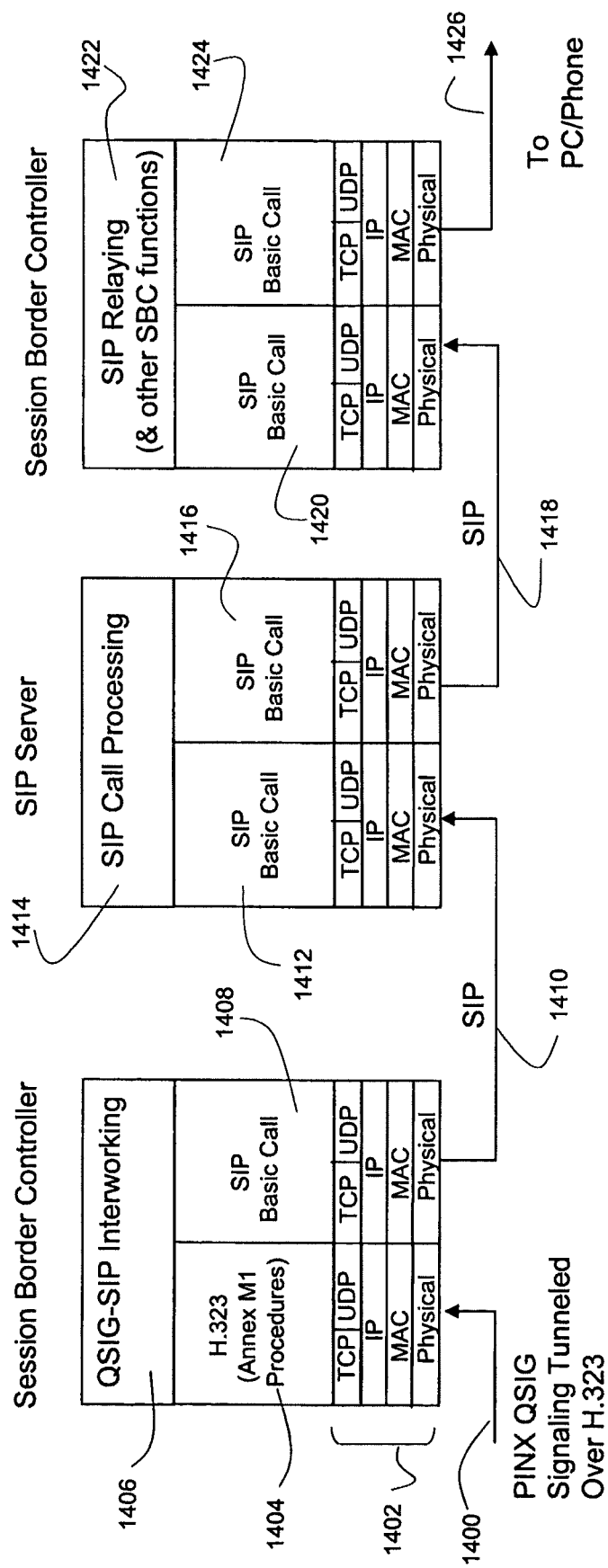
FIG. 14 illustrates one embodiment of the protocol stacks for establishing a call between the two points according to the principles of the present invention.

FIG. 14 illustrates the end-to-end communication protocol stacks associated with the end-to-end communication. The QSIG message 1400 is received from the PINX at the SBC.

The message is processed by the lower IP network protocol layers 1402. The QSIG messages, in this embodiment, are received using the H.323 Annex M1 1404 tunneling procedures. The QSIG message is then interworked 1406 to SIP basic call messages 1408 transmitted by the IP network using SIP messages 1410. The messages are received at the SIP Server where the SIP basic call process 1412 parses the message and passes the indication to SIP call processing 1414. This results in the generation of a SIP message by the basic call protocol 1416 that is transmitted back down the lower layers of the protocol stack as SIP messages 1418 to the destination SBC. At the destination SBC, the SIP messages are received by the SIP Basic Call process 1420 and passed to the SIP relaying/interworking process 1422.

In other embodiments, the destination may also be a QSIG-based PINX, in which case, the SIP message may be interworked to a QSIG message, and transported by a tunnel to the PINX. However, in this embodiment, the destination PC/phone is capable of terminating the SIP protocol, and the SIP relaying/interworking process 1422 is not required to interwork the SIP messages. Thus, the SIP basic call control process 1424 generates the appropriate SIP message, which is then transmitted 1426 to the end user.

FIG. 15 illustrates another embodiment of the interworking of messages of the various network elements of FIG. 13. This illustration only focuses on the basic call establishment aspects, and more specifically, focuses on the call origination aspect. The PINX 1500 originates the call or session, which is received by the SBC 1502 that interworks the QSIG message to the SIP protocol. The SIP message is received by the SIP proxy/server 1504, which in turn sends the SIP message to the SBC 1506 that relays the SIP messages to the destination, which is the PC/Phone 1508 combination.

The initial QSIG call setup message 1510a is sent by the PINX to the SBC. The QSIG message is tunneled according to standard procedures, and one approach is to embed the QSIG SETUP message in a H.323 FACILITY message as defined in Annex M1. The SBC receives the message and interworks this to a SIP "INVITE" message that is sent to the SIP Service, and the remote SBC, and then to the PC/Phone.

The PC/Phone 1508 responds with a SIP-based "Trying" message 1512a which is sent back over the same path. Upon reaching the SBC 1502, however, the message is not interworked to the PINX. The PC/Phone 1508 next responds with a "ringing" message 1514a which is also sent back.

In the preceding specification, the invention has been described with reference to specific exemplary embodiments thereof. It will, however, be evident, that various modifications and changes may be made thereunto without departing from the broader sprit and scope of the invention as set forth in the claims that follow. The specification and drawings are accordingly to be regarded in an illustrative, rather than restrictive, sense.

That which is claimed:

1. A system, comprising:
an interface to a communications network; and
a controller in said communications network connected to said interface over a communications link;
wherein said interface is configured to:
receive a QSIG-based message, said QSIG-based message being tunneled in a tunneling message, and
transmit said tunneling message over said communication link to said controller;
wherein said controller is configured to:
extract said QSIG-based message from said tunneling message,
interwork said QSIG-based message to at least one SIP-based message, and
transmit said at least one SIP based message over a second communication link to a SIP server.

2. The system of claim 1, wherein said QSIG-based message is a SETUP message requesting a communication service.

3. The system of claim 1, wherein said QSIG-based message is originated by a QSIG-based private exchange device connected to said interface over another communication link, and said controller is further configured to authenticate said QSIG-based private exchange device.

4. The system of claim 3, wherein said controller is further configured to determine a resource required to provide a communication service requested by said QSIG-based message.

5. The system of claim 4, wherein said resource required is a specified amount of bandwidth for said communication service.

6. The system of claim 1, wherein said controller is a session border controller.

7. The system of claim 1, wherein said tunneling message is an H.323 message.

8. The system of claim 7, wherein said H.323 message is a FACILITY message.

9. The system of claim 1, wherein said controller is further configured to:
identify a service profile associated with a QSIG-based communication device that originated said QSIG-based message, and
determine that a request for a communication service included in said QSIG-based message is authorized based on said service profile.

10. The system of claim 9, wherein said controller is further configured to:
determine at least one network resource in said communications network associated with said request for said communication service, and
determine whether said at least one network resource is available for allocation to provide said communication service.

11. The system of claim 10, wherein said requested communication service is a voice over IP service.

12. The system of claim 1, wherein said controller is further configured to interwork said QSIG-based message to at least one SIP-based message by way of interworking said QSIG-based message into at least one message of a messaging protocol, and interworking said at least one message of the messaging protocol into said at least one SIP-based message.

13. A system, comprising:
a communication network; and
a network node at a point of entry to said communications network, said network node configured to:
receive a tunneled first QSIG-based signaling message from a private integrated services exchange (PINX) requesting a communication service of said communication network,
identify a service profile of a user associated with said first QSIG-based message,
determine said user is authorized to request said communication service from said communication network based on said service profile,
identify at least one network resource usable in fulfilling said communication service request,
determine said at least one network resource is available,
interwork said first QSIG-based message to a SIP message, and transmit said SIP message toward a destination node to establish said communication service.

14. The system of claim 13, further comprising a second network node at a second point of entry to said communications network, said second network node configured to:
receive said SIP message, and
interwork said SIP message to a second QSIG-based message to transmit to said destination node.

15. The system of claim 14, wherein said second QSIG-based message is tunneled using an H.323 message.

16. A system, comprising:
a first session border controller at a point of entry of a communications network, said first session border controller being configured to:
receive a first signaling message originating from a first private integrated services exchange (PINX) over a physical link of a communications network, said first signaling message being tunneled into at least one tunneling message,
extract said first signaling message,
determine a requested communication service associated with said first signaling message,
identify a resource usable to provide said requested communication service,
allocate said resource for said requested communication service,
interwork said first signaling message to a first SIP-based message, and
transmit said first SIP-based message to a SIP server; and
a second session border controller at a second point of entry of said communications network, said second session border controller being configured to:
receive a second SIP-based message from said SIP server, and
transmit a second signaling message to a second PINX to establish said communications service from said first PINX to said second PINX.

17. The system of claim 16, wherein said first session border controller is further configured to:
access a user service profile, and
determine whether said resources to be allocated are authorized by said user service profile.

18. The system of claim 17, wherein said resource is associated with providing voice over IP service.

19. The system of claim 16, wherein said first signaling message is an H.323 message.

20. The system of claim 16, wherein said first signaling message is a QSIG-based message tunneled in an H.323 message and said first session border controller is further configured to:
interwork said QSIG-based message to a H.323-based message, and
interwork said H.323-based message to said first SIP-based message.

21. The system of claim 16, wherein said first signaling message is tunneled by way of a SIP tunnel.

22. The system of claim 16, wherein said second signaling message is a QSIG-based message, and said second session border controller is further configured to interwork said second SIP-based message to said QSIG-based message.

23. The system of claim 16, wherein said second signaling message is a SIP-based message.

24. The system of claim 16, further comprising a SIP server configured to:
receive said first SIP-based message from said first session border controller,
parse said first SIP-based message, and
send said second SIP-based message to said second session border controller responsive to said first SIP-based message.

* * * * *